United States Patent [19]

Chikada et al.

[11] Patent Number: 5,500,790
[45] Date of Patent: Mar. 19, 1996

[54] DEVICE FOR CONFIRMING OPTICAL-AXIS ADJUSTMENT OF AUTOMOTIVE HEADLAMP

[75] Inventors: Akira Chikada; Shigeteru Ohgiri, both of Isehara; Hiroe Ito, Fujisawa, all of Japan

[73] Assignee: Ichikoh Industries, Ltd., Tokyo, Japan

[21] Appl. No.: 39,441

[22] PCT Filed: Nov. 20, 1992

[86] PCT No.: PCT/JP92/01525

§ 371 Date: Apr. 30, 1993

§ 102(e) Date: Apr. 30, 1993

[30] Foreign Application Priority Data

Nov. 21, 1991 [JP] Japan ................................ 3-095619 U
Feb. 7, 1992 [JP] Japan ................................ 4-004664 U
Feb. 20, 1992 [JP] Japan ................................ 4-007130 U

[51] Int. Cl.$^6$ .................... B60Q 1/04; F21M 3/22
[52] U.S. Cl. ...................... 362/66; 362/61; 362/418; 362/427; 33/379; 33/335
[58] Field of Search ..................... 362/61, 80, 269, 362/66, 418, 277, 287, 419, 427, 289, 285, 428, 101; 33/335, 288, 379, 376, 375, 370

[56] References Cited

U.S. PATENT DOCUMENTS

| 5,055,980 | 10/1991 | Mochizuki | 362/61 |
| 5,067,052 | 11/1991 | Suzuki et al. | 362/61 |
| 5,083,244 | 1/1992 | Shirai et al. | 362/61 |
| 5,121,303 | 6/1992 | Shirai et al. | 362/61 |
| 5,337,222 | 8/1994 | Shirai et al. | 362/66 |
| 5,365,414 | 11/1994 | Chikada et al. | 362/61 |

FOREIGN PATENT DOCUMENTS

| 813600 | 9/1951 | Germany | 33/379 |
| 51-33614 | 8/1976 | Japan . | |
| 55-142345 | 10/1980 | Japan . | |
| 62-192209 | 12/1987 | Japan . | |
| 1-173502 | 7/1989 | Japan . | |
| 3-24204 | 3/1991 | Japan . | |
| 3-124403 | 12/1991 | Japan . | |

*Primary Examiner*—James C. Yeung
*Assistant Examiner*—Thomas M. Sember
*Attorney, Agent, or Firm*—Foley & Lardner

[57] ABSTRACT

A device for confirming the optical-axis adjustment of an automotive headlamp in which the initial-setting mechanism for the level is composed of a reduced number of parts, the level can be simply attached and the initial setting of the revel can be simply adjusted. The casing of the level and the resilient member are formed integrally with each other, so that the initial setting mechanism for the level can be composed of a reduced number of parts. The level has an engagement projection formed thereon and the to-be-adjusted body has provided thereon a receptacle having an engagement hole. The level can be installed in the receptacle simply and securely by driving the initial-setting adjusting screw into the engagement projection. A seat portion is provided around the head of the initial-setting adjusting screw. The seat portion has provided thereon a mount surface formed nearly perpendicular to the axis of the initial-setting adjusting screw and on which a tool is mounted. So, when adjusting the initial setting of the level by turning the initial-setting adjusting screw by means of the tool, the level will not be moved against the resilience of the resilient member and the state of the level will not be deviated from the initial one. Thus, the initial setting of the level can be simply adjusted.

14 Claims, 23 Drawing Sheets

DEVICE FOR CONFIRMING OPTICAL-AXIS ADJUSTMENT OF AUTOMOTIVE HEADLAMP

FIELD OF THE INVENTION

The present invention relates to a device for confirming the adjustment, in the up/down or vertical direction, of the optical axis of an automotive headlamp. This optical-axis adjustment confirming device uses a level comprising a casing which houses and holds a bubble tube. The position of a bubble in the bubble tube of the level is visually checked to see whether or not the optical axis of the automotive headlamp has been correctly adjusted in the vertical direction.

More particularly, the present invention provides a device for confirming the optical-axis adjustment of an automotive headlamp in which the initial setting mechanism of the level is made up of a reduced number of parts, can be easily installed and also the initial setting of the level can be adjusted very easily.

BACKGROUND OF THE INVENTION

If directed too far upward, the light beam projected from the automotive headlamp will dazzle the driver of a car running in the opposite lane, possibly causing a danger. On the contrary, if directed too far downward, the headlamp will not provide a sufficient illumination of the road in front of the car for assurance of safe driving. Therefore, the automotive headlamp must be provided with a device which is fixed on the car body for fine adjustment of the optical-axis in the vertical direction.

A typical one of the automotive headlamps of this type is known from the disclosure in the U.S. Pat. No. 5,055,980, in which a to-be-adjusted body is pivotably mounted on a mount body by means of a pivot bearing, a lamp bulb is fixed to the to-be-adjusted body, and a device for adjusting the optical axis in the vertical direction is fixed between the to-be-adjusted body and the mount body. The vertical optical-axis adjuster is operated to pivot the to-be-adjusted body vertically with respect to the mount body for adjustment of the optical axis in the vertical direction.

The above-mentioned automotive headlamp is provided with a right/left or horizontal optical-axis adjuster in addition to the vertical optical-axis adjuster. The horizontal optical-axis adjuster can be operated to pivot the to-be-adjusted body horizontally with respect to the mount body for adjustment of the optical axis in the horizontal direction.

The above-mentioned automotive headlamps include two types. In one of these two types, the reflector is movable, and the reflector as the to-be-adjusted body is pivotably mounted on a lamp housing as the mount body. In the other type, the lamp unit is movable, and the lamp unit as the to-be-adjusted body is pivotably mounted on the car body as the mount body.

The direction of the optical axis must be adjusted with a high accuracy and can be adjusted accurately only by a specialist using a special equipment. Before shipment from the automobile manufacturing works or when the headlamps are equipped on a car at an adjustment shop, the optical axes of the head lamps are adjusted by the specialist with the special equipment. If the optical axis of the headlamp of a car is found deviated from its due direction for any reason after adjusted at such works or shop, it must be readjusted.

However, some reference is available for such readjustment. Namely, since the optical axis of the headlamp has already been adjusted accurately, it can be readjusted without any special equipment and specialist by reproducing its initial state of adjustment. For this purpose, there have been proposed various kinds of optical-axis adjustment confirming devices (more specifically, devices for confirming whether the initially adjusted state of the optical axis has been reproduced or not) designed based on such a concept.

A typical one of such devices is disclosed in the aforementioned U.S. Pat. No. 5,055,980.

This conventional optical-axis adjustment confirming device comprises a horizontal extension formed on the to-be-adjusted body thereof, a casing fixed indirectly to the horizontal extension by means of a leaf spring or the like or directly to it with a screw or the like, a bubble tube, a cover supporting the bubble tube at the rear side thereof and of which one end is engaged on one end of the casing, and a spring and adjusting screw used to fix the other end of the cover vertically tiltably to the other end of the casing.

After completion of the optical-axis adjustment by the specialist using the special equipment, the optical-axis adjustment confirming device is initially set by turning the adjusting screw for the bubble in the bubble tube to come to the reference line (zero point on the scale). When the optical axis of the headlamp is considered to have been directed in a wrong direction as caused by a remodeling of the car body or loading of the car, the position of the bubble in the bubble tube is visually checked with the car kept stopped on a horizontal floor or ground surface. If the bubble is found not coincident with the reference line, it means that the vertical direction of the optical axis is deviated from a correct one. In this case, it sufficient to tilt the to-be-adjusted body vertically, for the bubble to be coincident with the reference line, by operating the vertical optical-axis adjustment confirming device while watching the movement of the bubble in the bubble tube. By this operation, the optical axis will restore its accurately adjusted initial vertical direction.

The present invention has an object to provide a device for confirming the optical-axis adjustment of an automotive headlamp in which the initial setting mechanism of the level is composed of a reduced number of parts, can be easily installed and also the initial setting of the level can be adjusted very easily.

DISCLOSURE OF THE INVENTION

The above object is accomplished by providing an optical-axis adjustment confirming device comprising, in a first mode of the present invention, a level consisting of a casing and a bubble tube, the level being installed to the to-be-adjusted body by means of a mounting member, a resilient member being interposed between the level and the mounting member, and an initial-setting adjusting screw being driven into the mounting member through the level so that the initial setting of the level can be adjusted, the casing of the level and the resilient member being formed integrally with each other.

In this first mode, since the casing of the level is formed integrally with the resilient member, the initial setting mechanism of the level can be made up of a reduced number of parts.

The above object is also accomplished by providing an optical-axis adjustment confirming device comprising, in a second mode of the present invention, a level having an engagement projection formed in the casing thereof, the to-be-adjusted body being provided with a receptacle having an engagement hole in which the engagement projection is fitted, a resilient member being interposed between the level and the receptacle, an initial-setting adjusting screw being driven into the engagement projection through the level to positively engage the engagement projection in the engagement hole, thereby fixing the level to the receptacle.

In the second mode, the level can be installed to the receptacle easily and securely owing to the engagement of the engagement projection of the level in the engagement hole formed in the receptacle of the to-be-adjusted body as well as to the driving of the initial setting screw into the engagement projection.

Further, the above object is accomplished by providing an optical-axis adjustment confirming device comprising, in a third mode of the present invention, a level consisting of a casing and a bubble tube, the level being installed to the to-be-adjusted body by means of a mounting member, a resilient member being interposed between the level and mounting member, and an initial-setting adjusting screw being driven into the mounting member through the level so that the initial setting of the level can be adjusted, a seat portion being provided around the head of the initial-setting adjusting screw and there being provided on the seat portion a mount surface on which a tool to turn the initial-setting adjusting screw is placed and which is directed perpendicularly to the axial direction of the initial-setting adjusting screw.

In the third mode, when the initial-setting of the level is adjusted by turning the initial-setting adjusting screw with the tool placed on the mount surface of the seat portion, no axial force will act on the initial-setting adjusting screw and so the level will not possibly be moved against the resilience of the resilient member. Thus, the state of the level will not possibly be deviated from the initial setting. Namely, the initial setting of the level can be easily adjusted.

BRIEF DESCRIPTION OF THE DRAWINGS

FIGS. 1 through 19 show a first embodiment of the optical-axis adjustment confirming device in a first mode of the present invention, of which:

Figure 2:
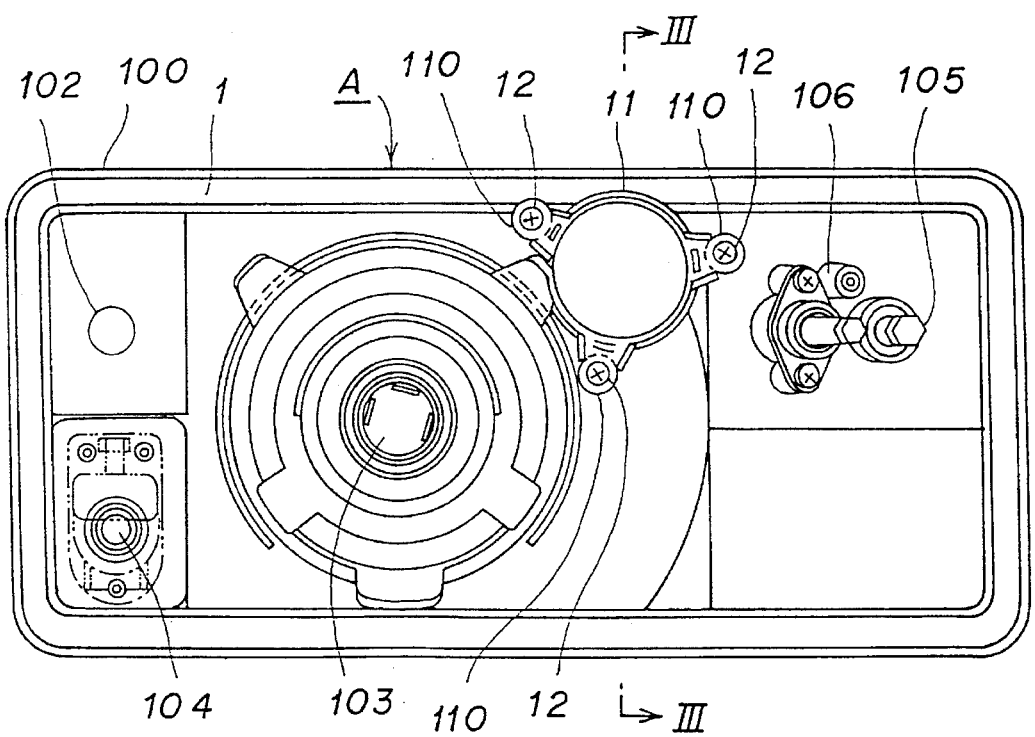
Figure 3:
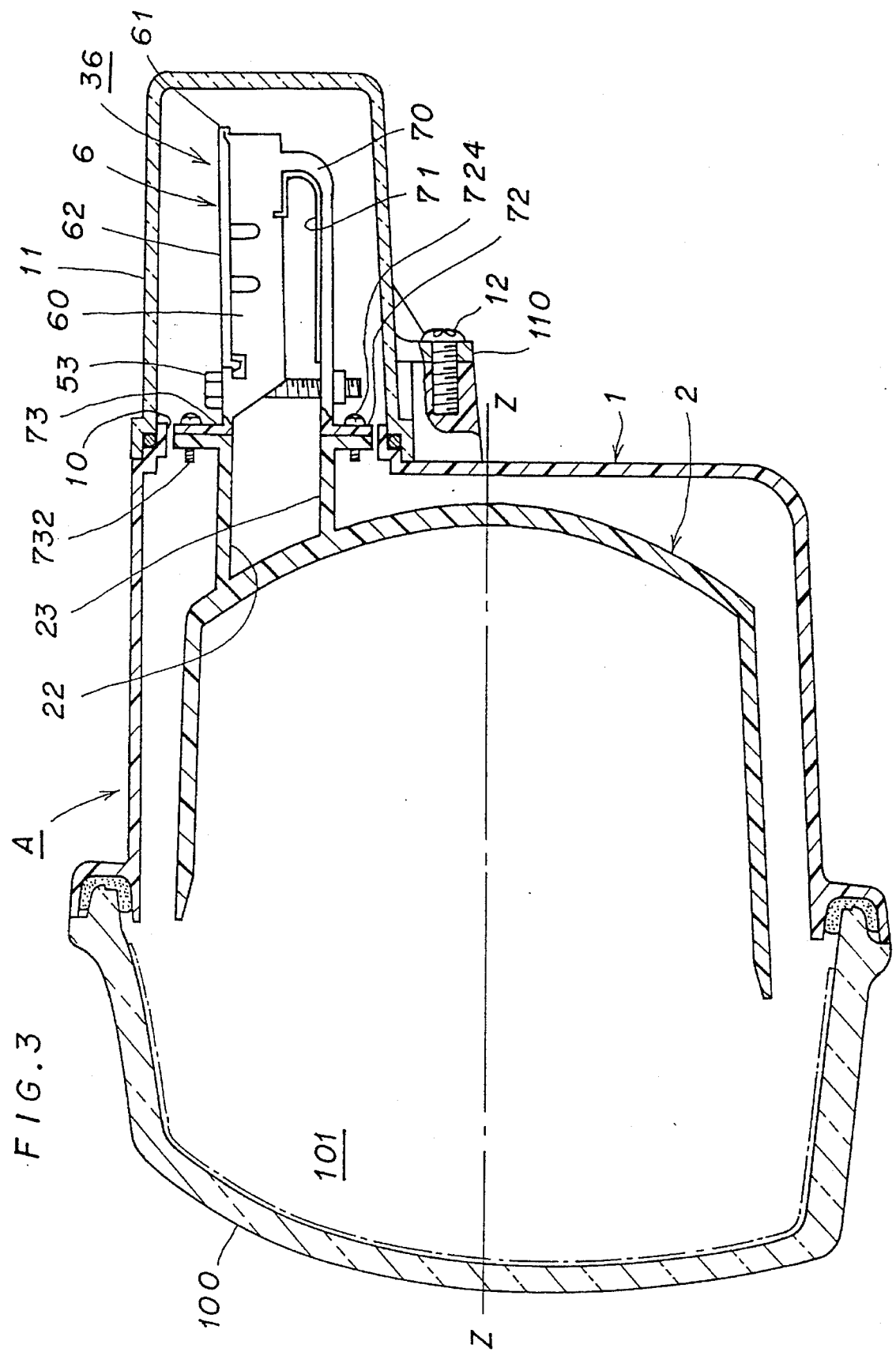
Figure 4:
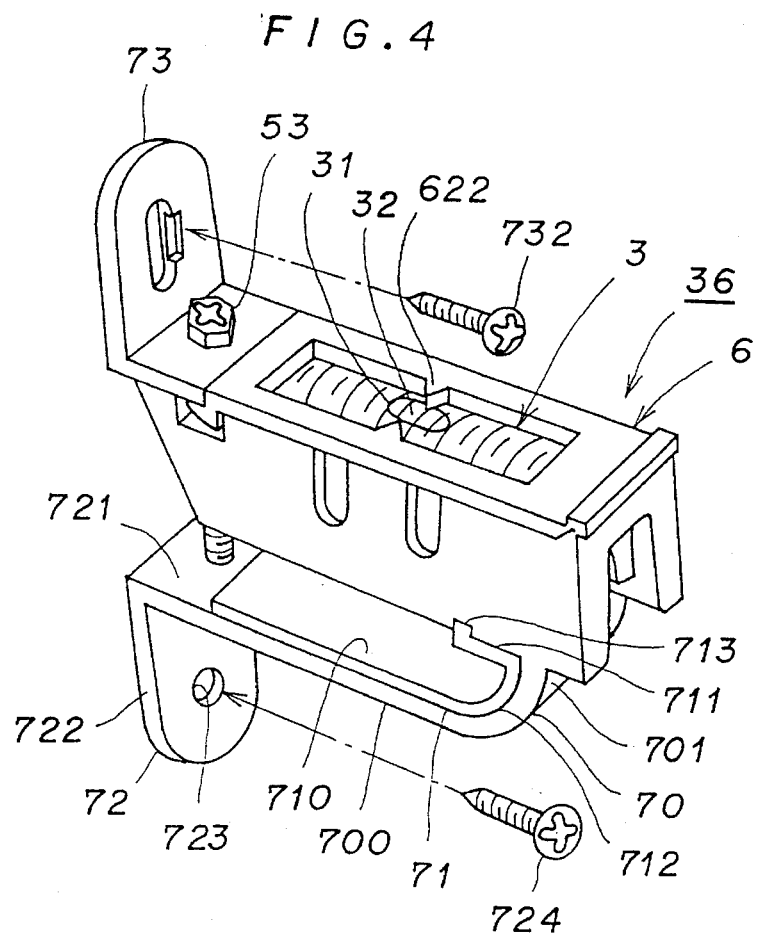
Figure 5:
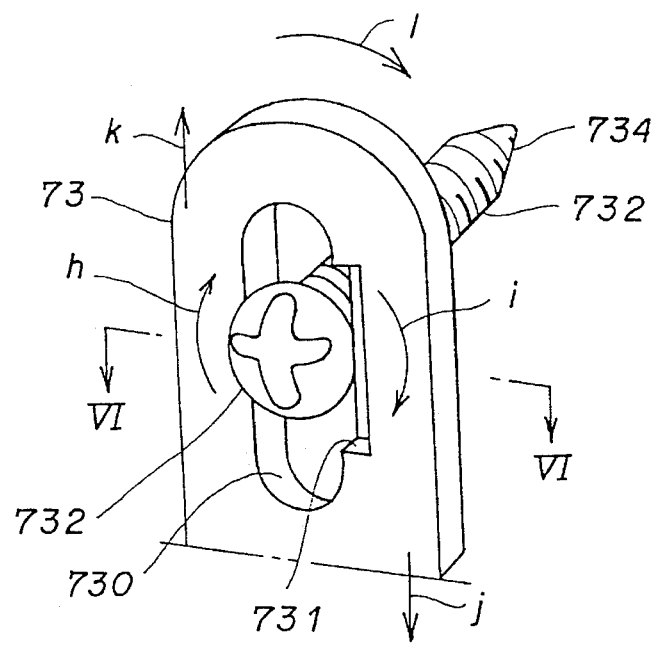
Figure 6:
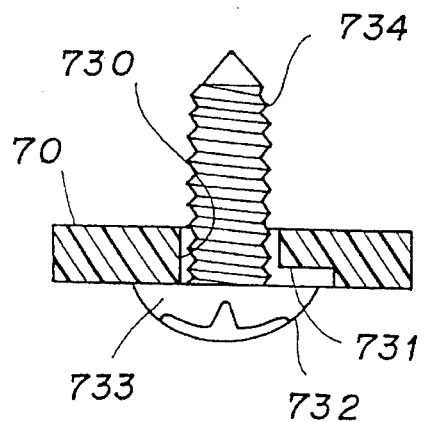
Figure 7:
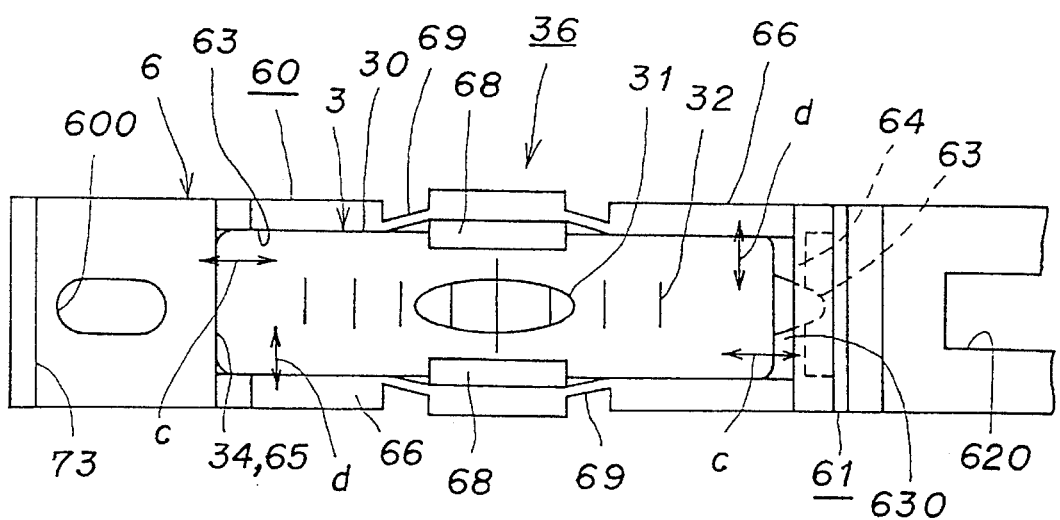
Figure 8:
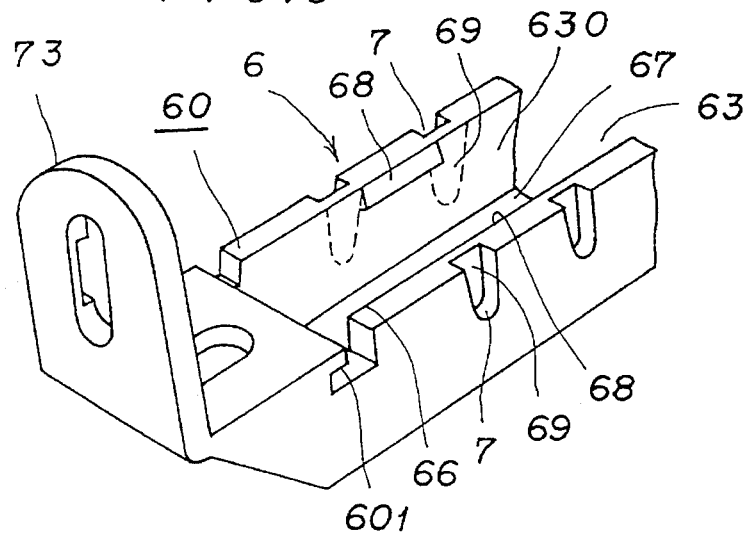
Figure 9:
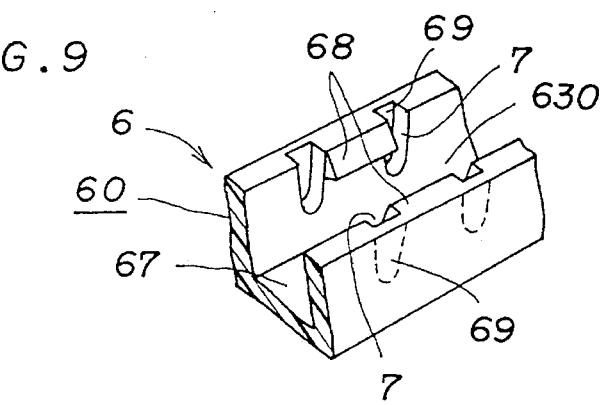
Figure 10:
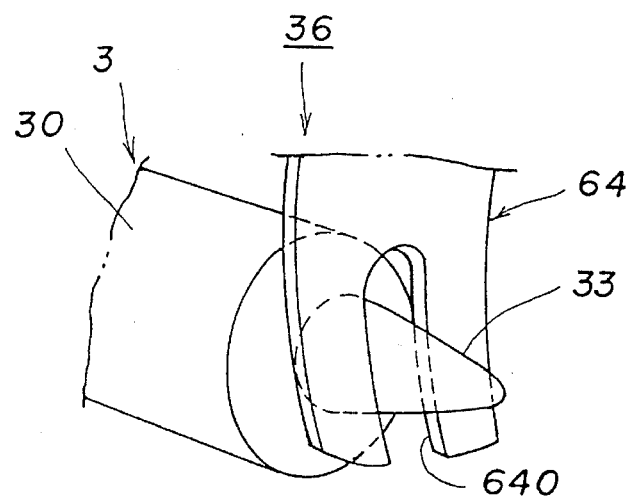
Figure 11:
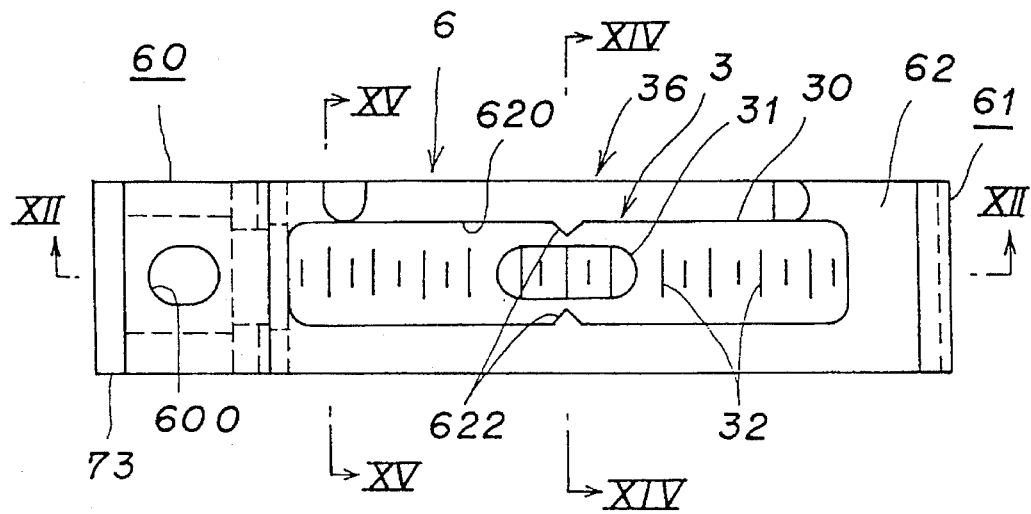
Figure 12:
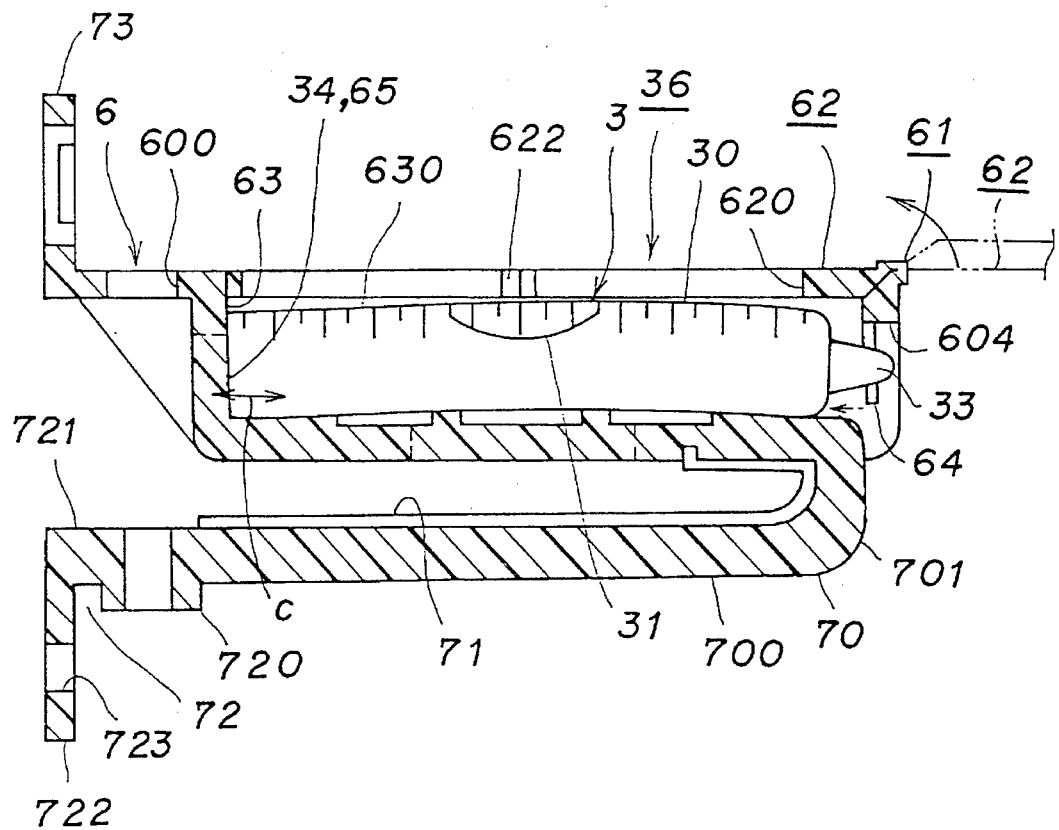
Figure 13:
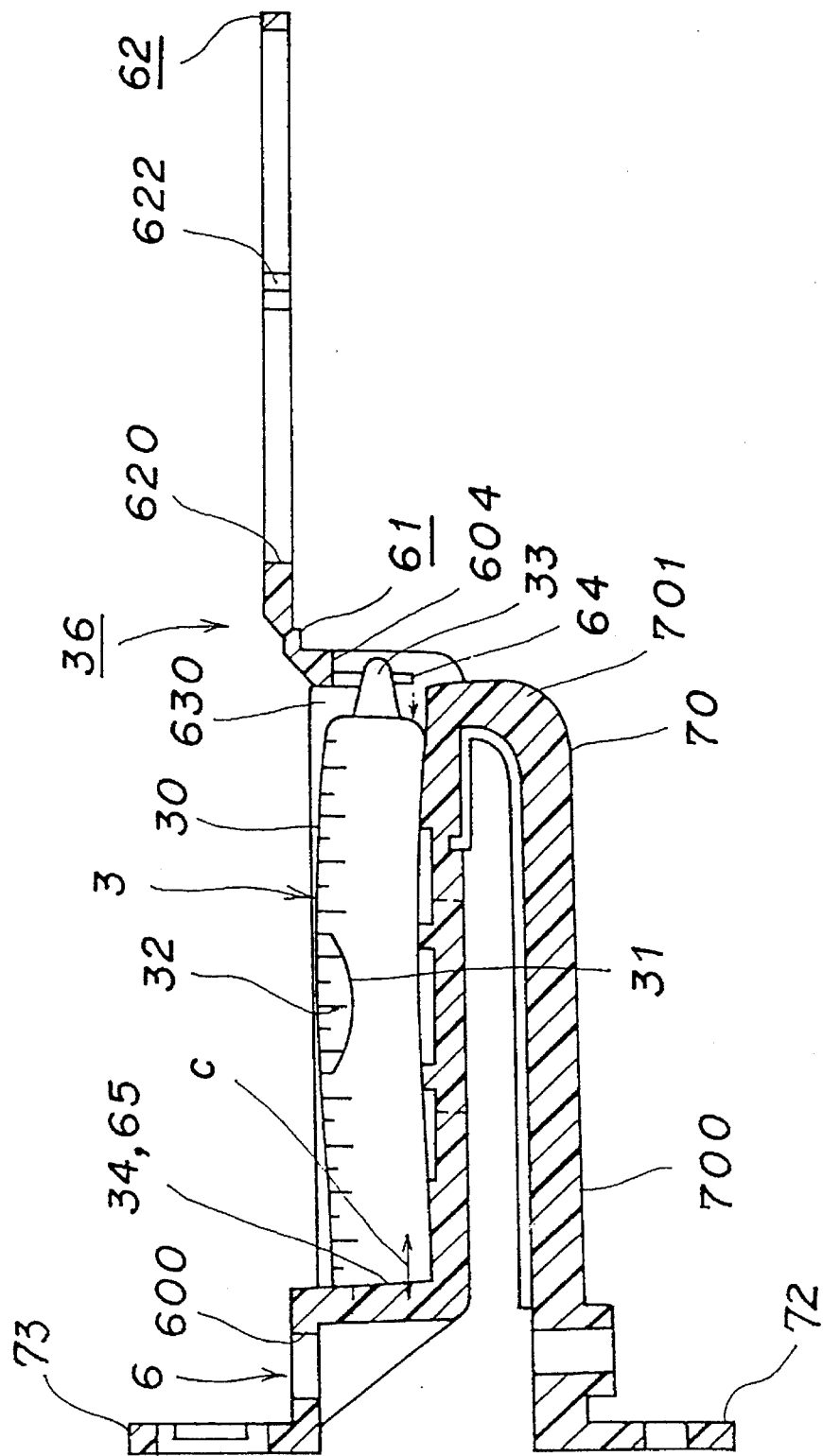
Figure 14:
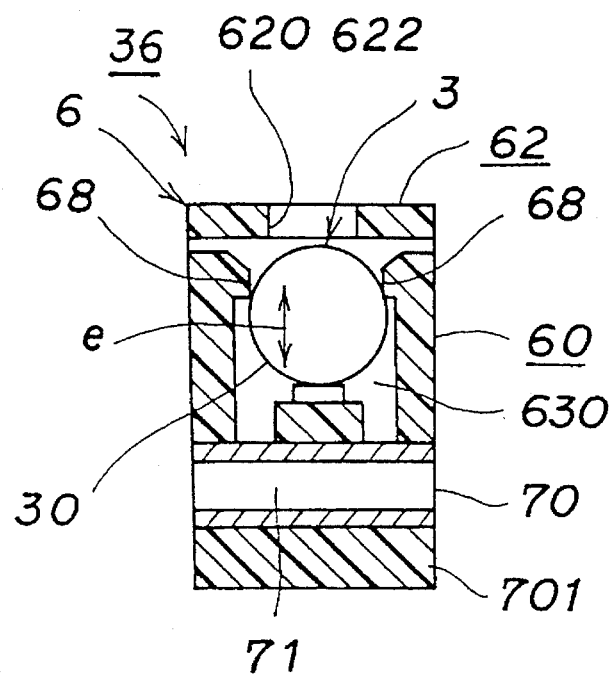
Figure 15:
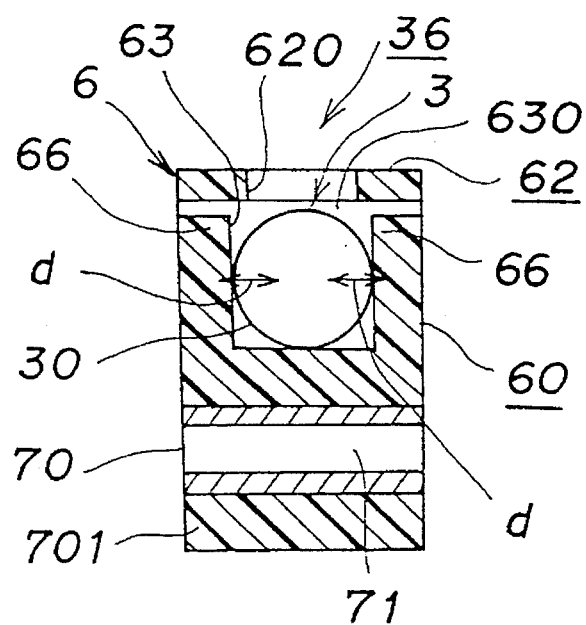
Figure 16:
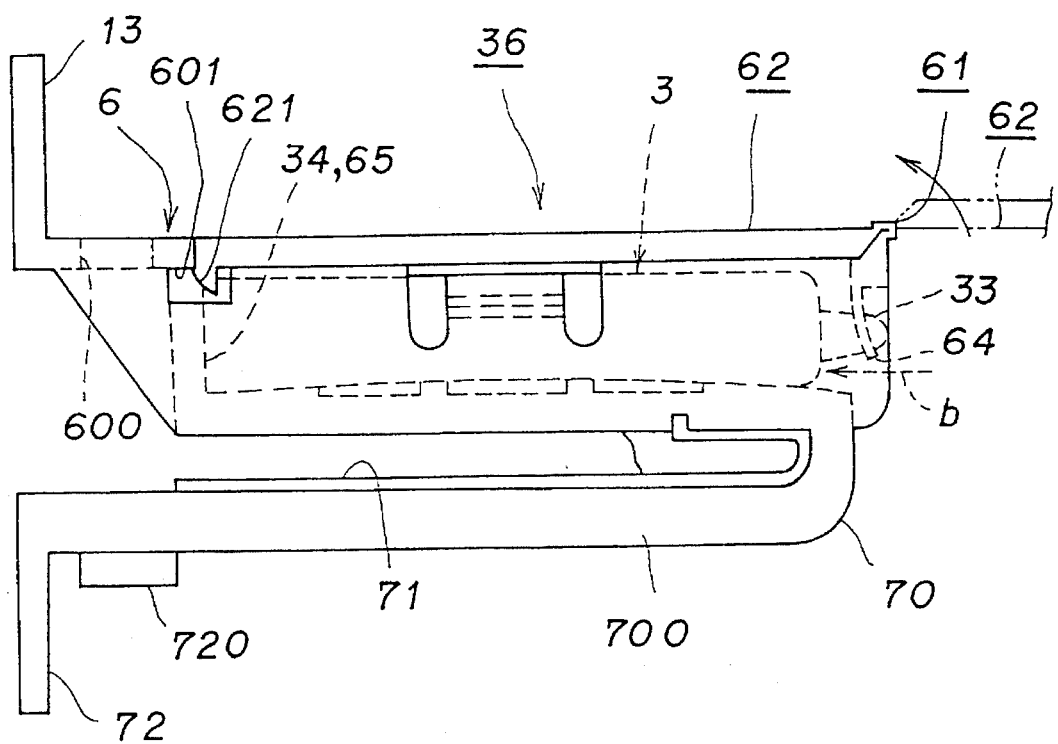
Figure 17:
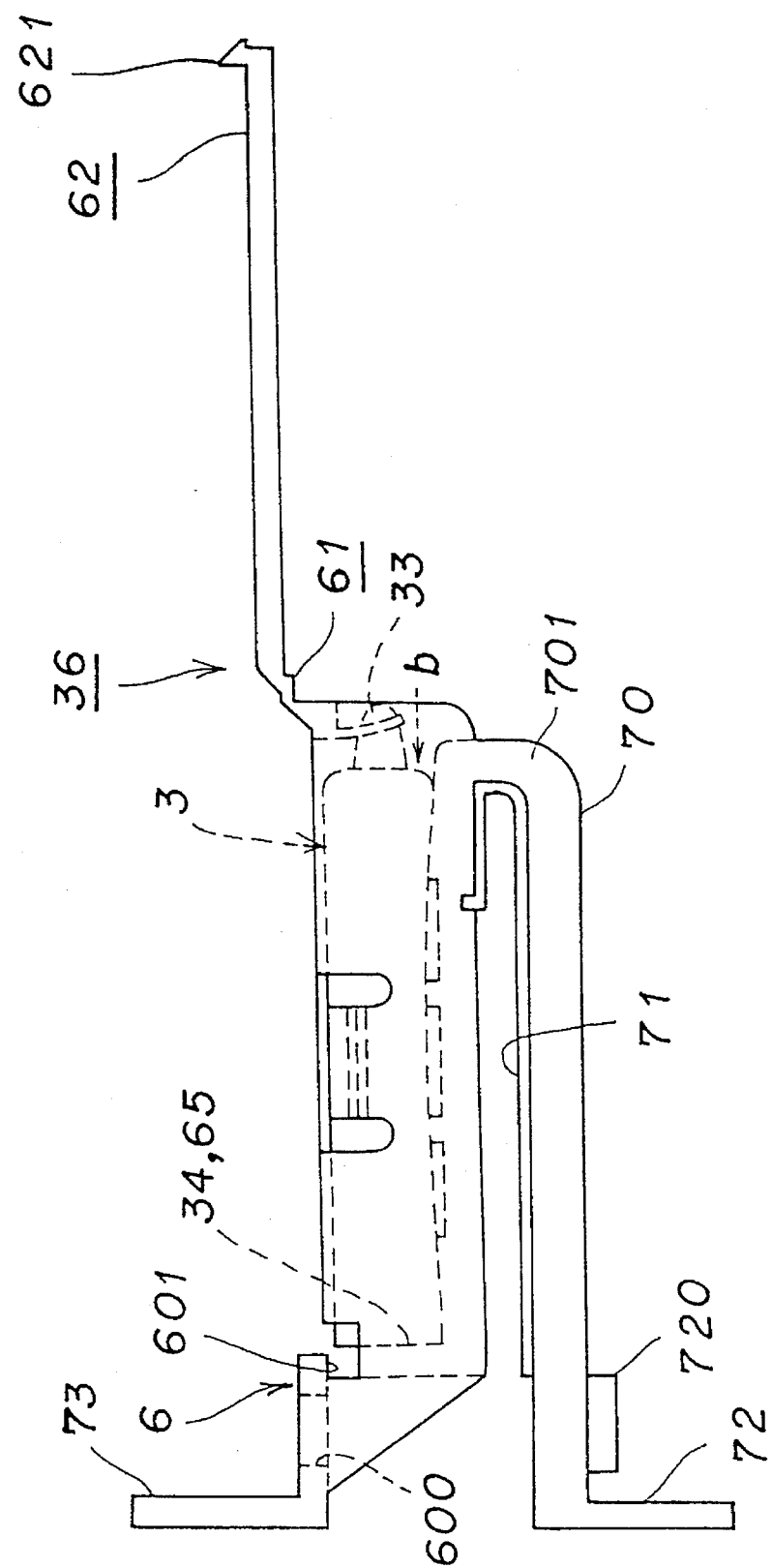
Figure 18:
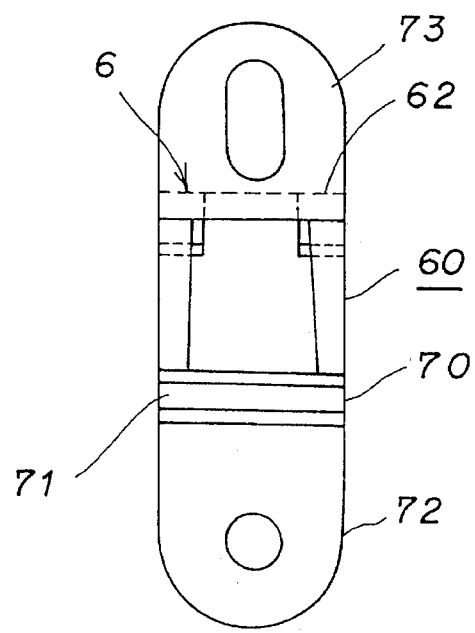
Figure 19:
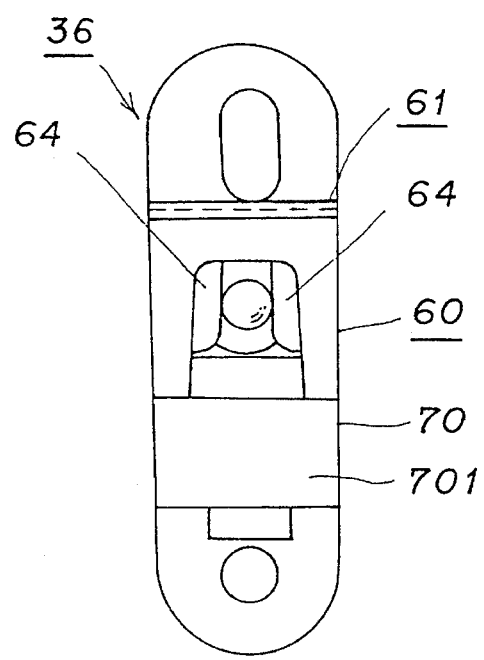
Figure 20:
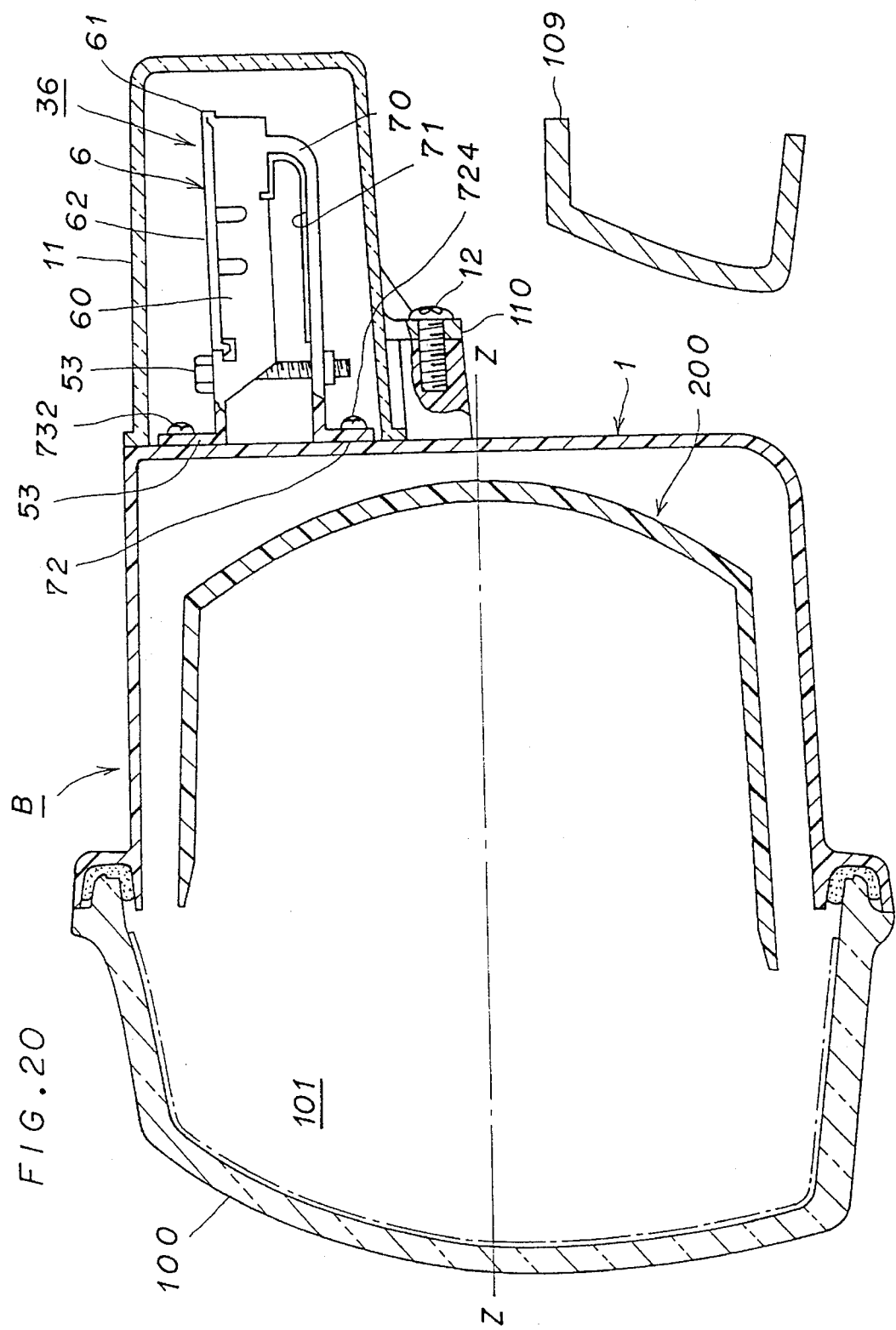
Figure 21:
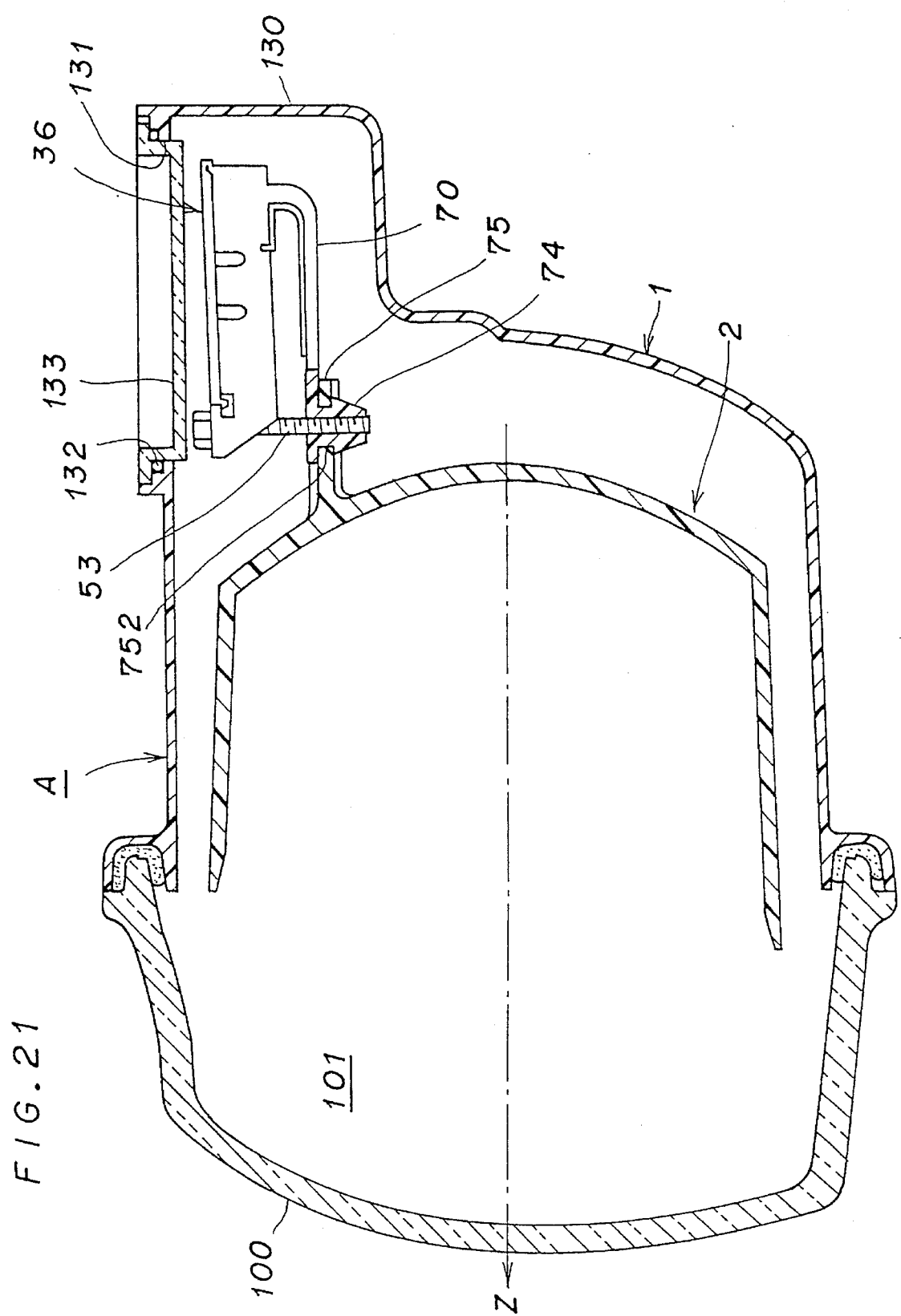
Figure 22:
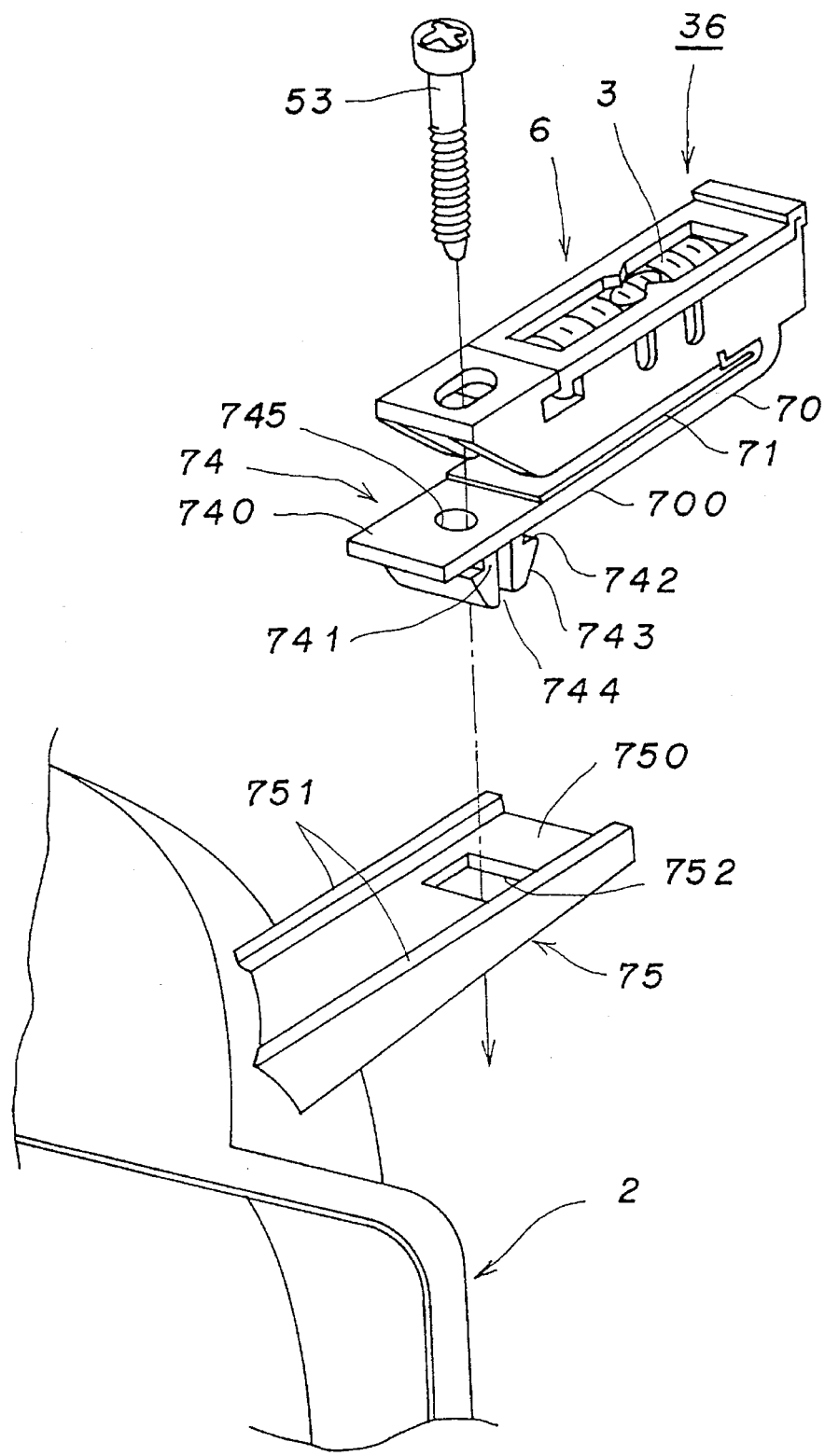
Figure 23:
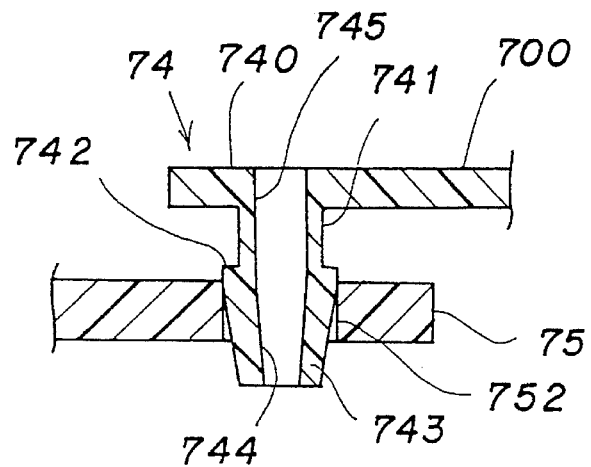
Figure 24:
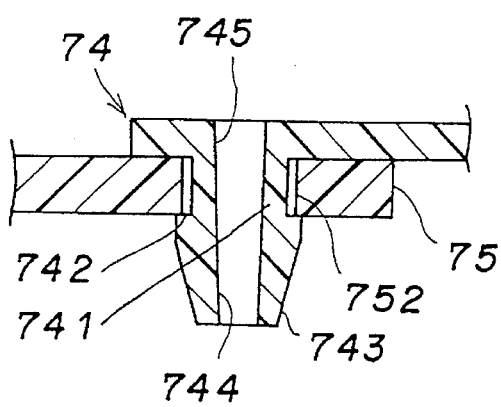
Figure 25:
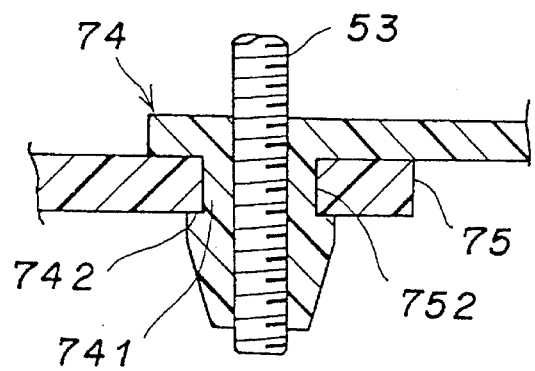
Figure 26:
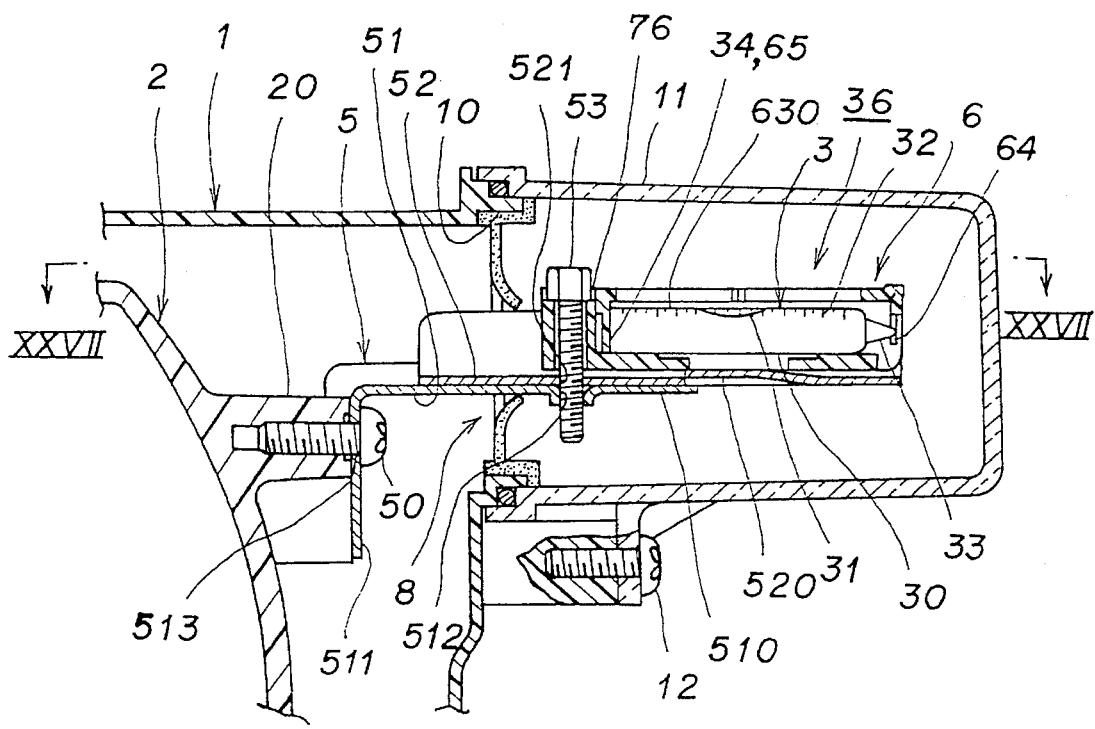
Figure 27:
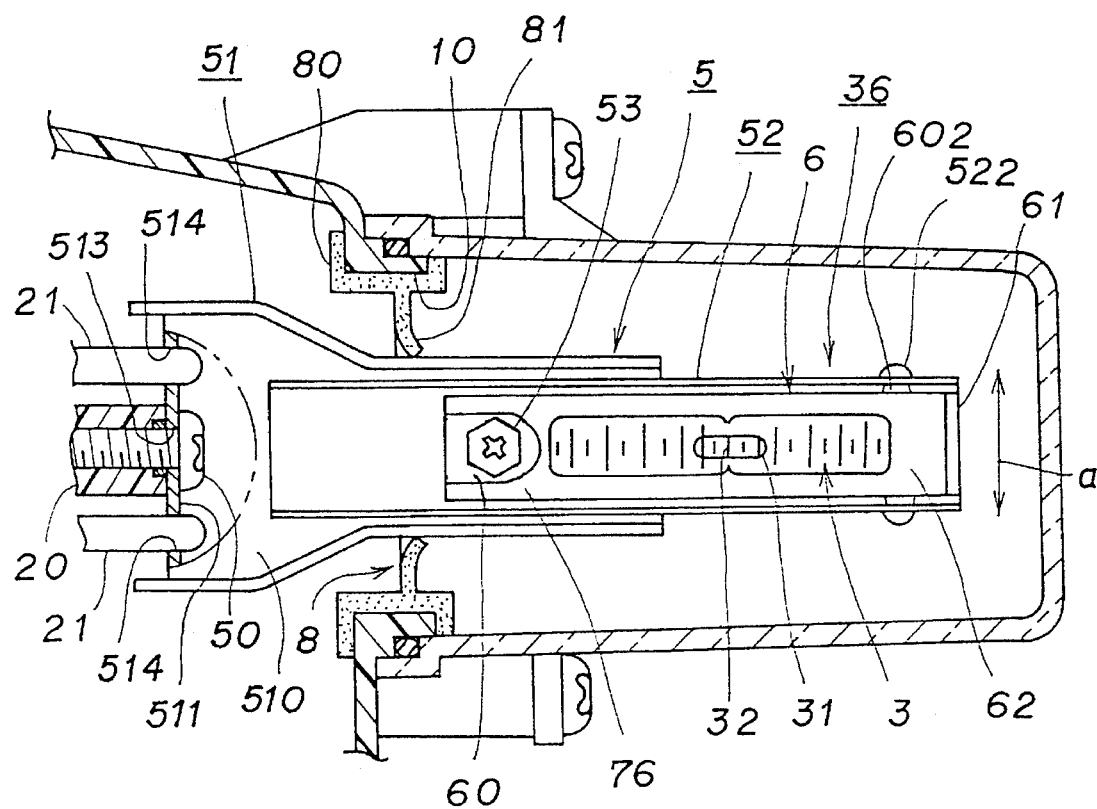
Figure 28:
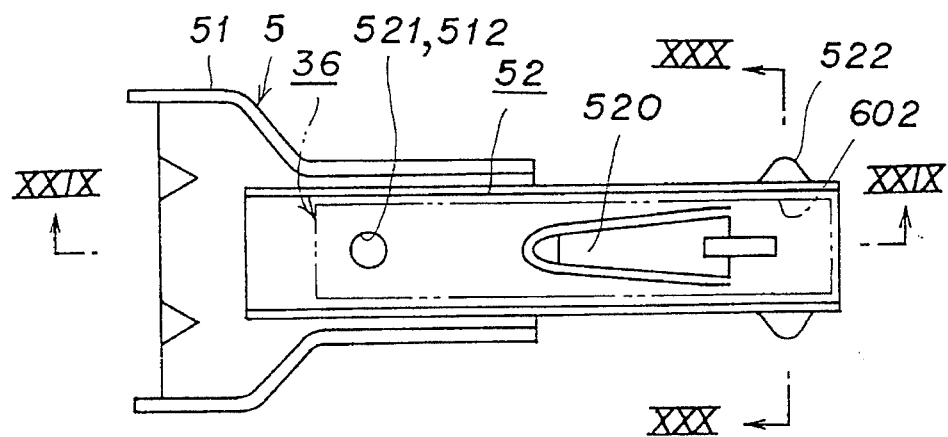
Figure 29:
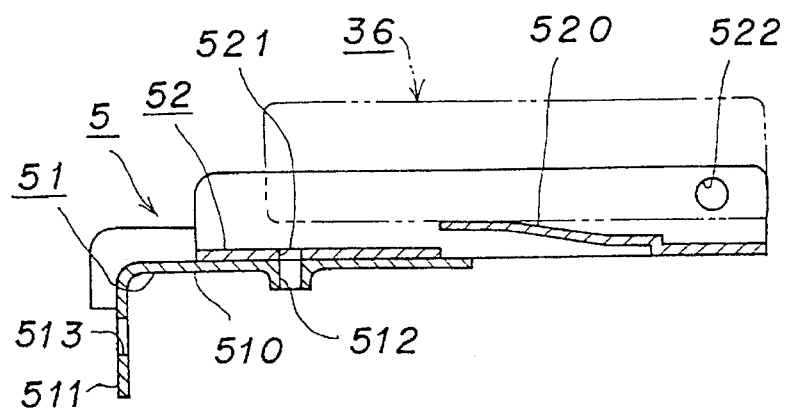
Figure 30:
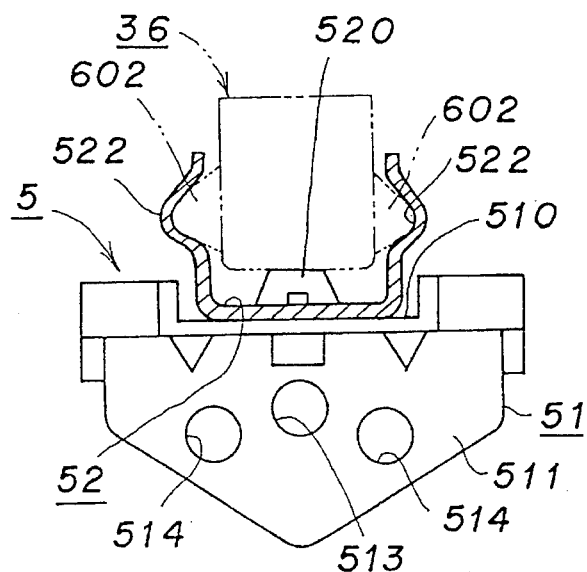
Figure 31:
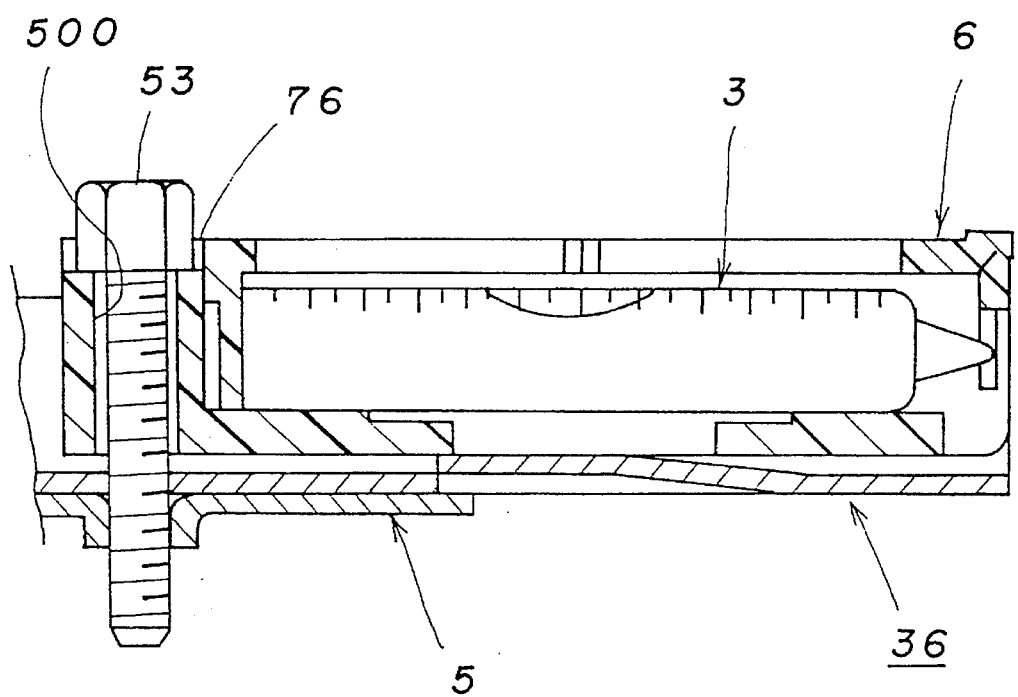
Figure 32:
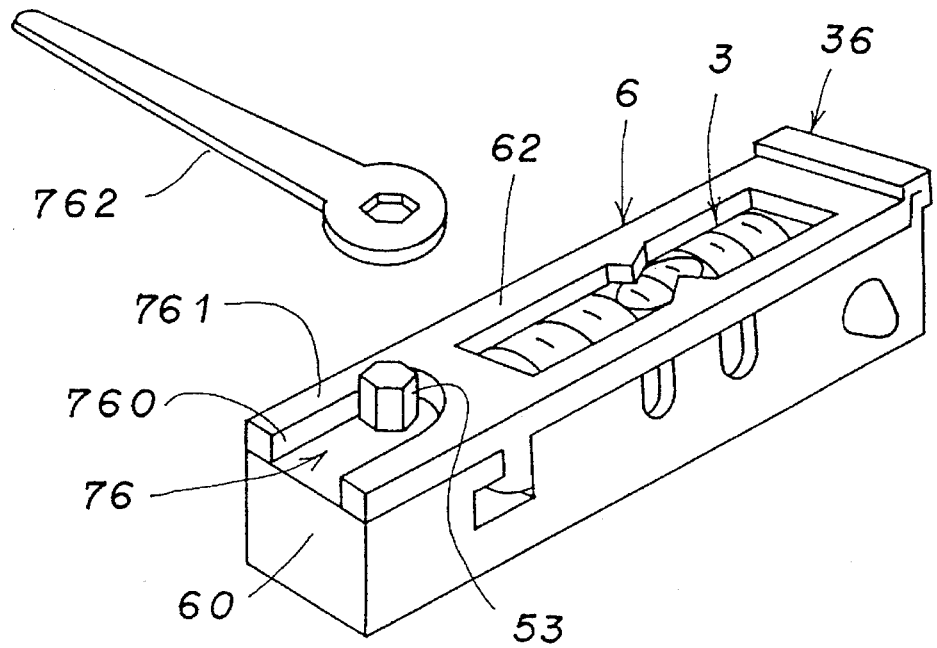
Figure 33:
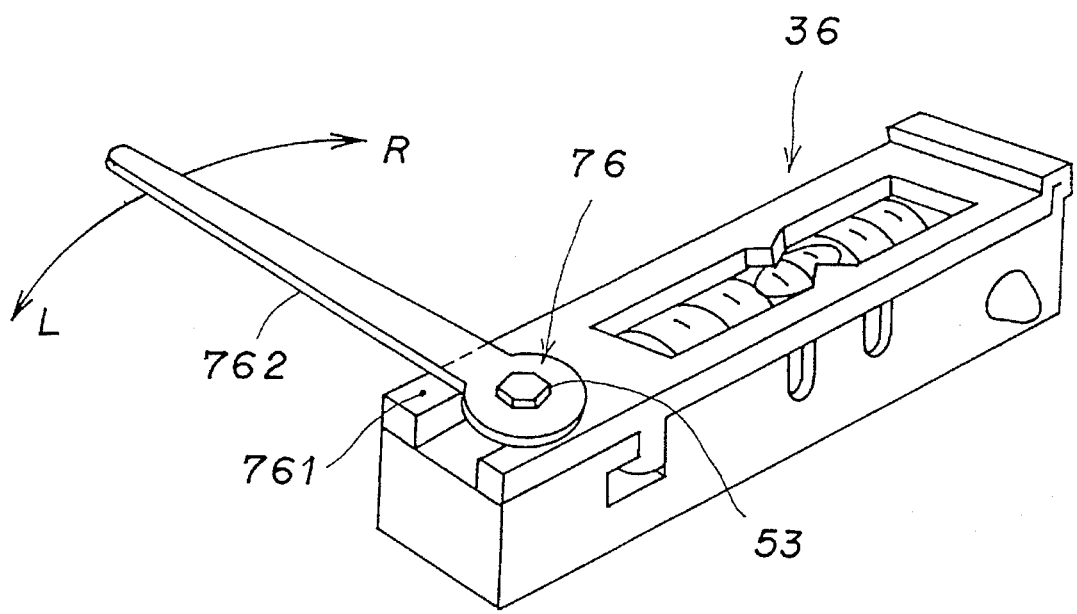
Figure 34:
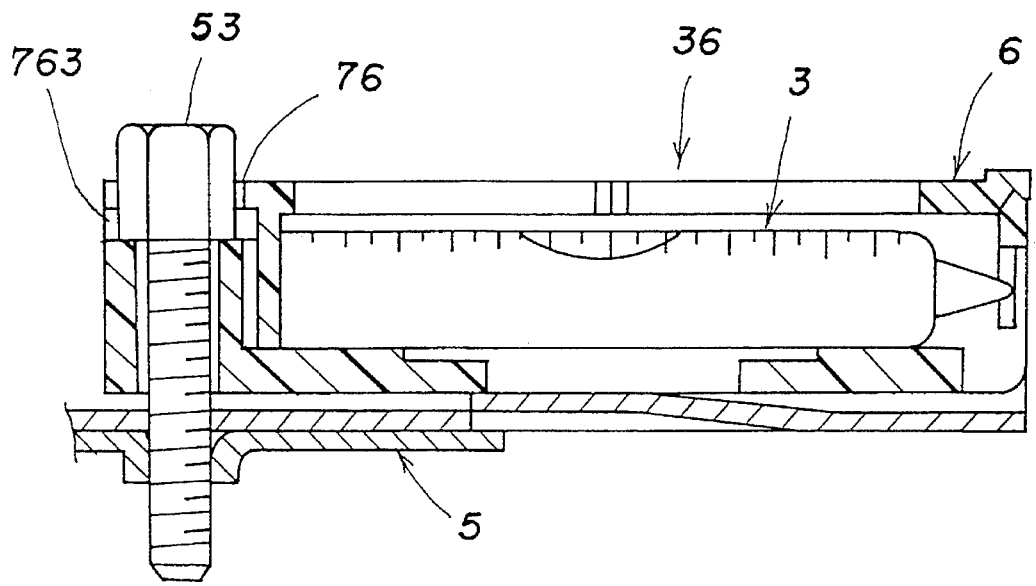
Figure 35:
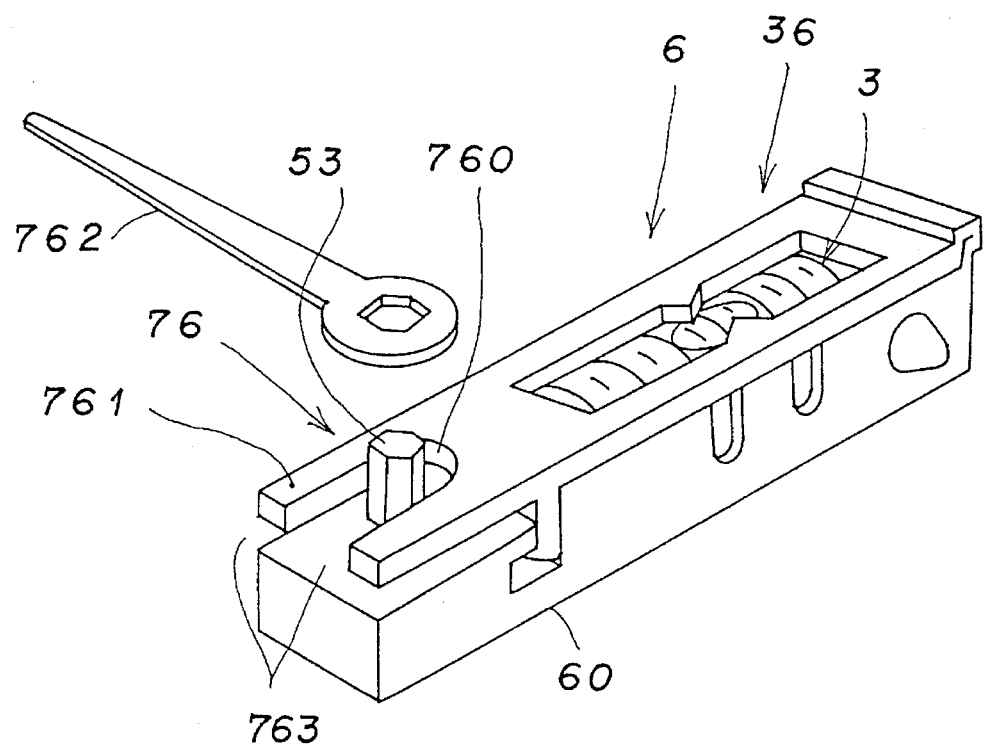
Figure 36:
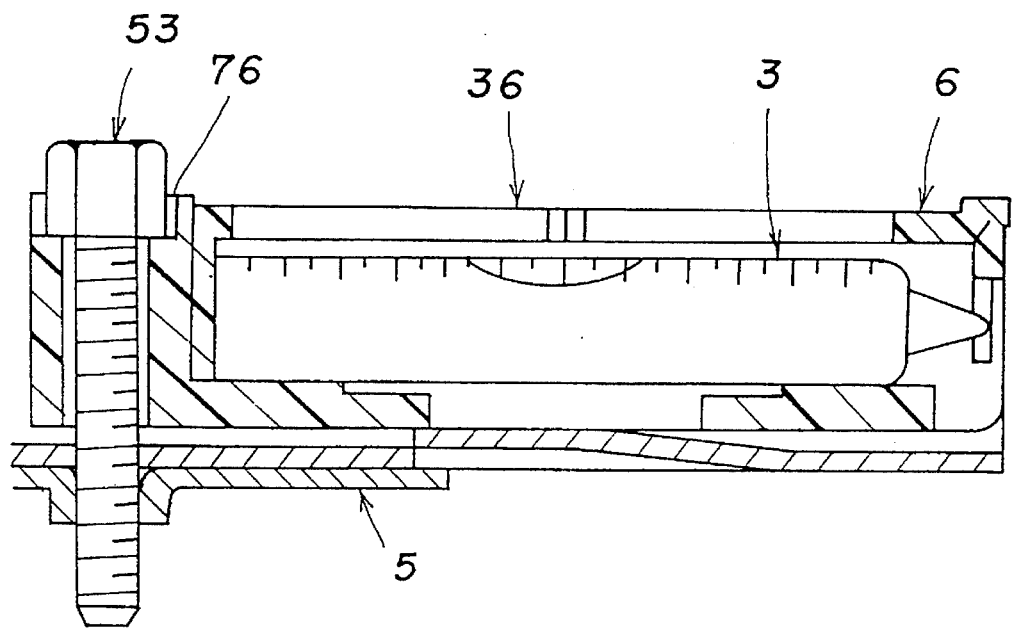
Figure 37:
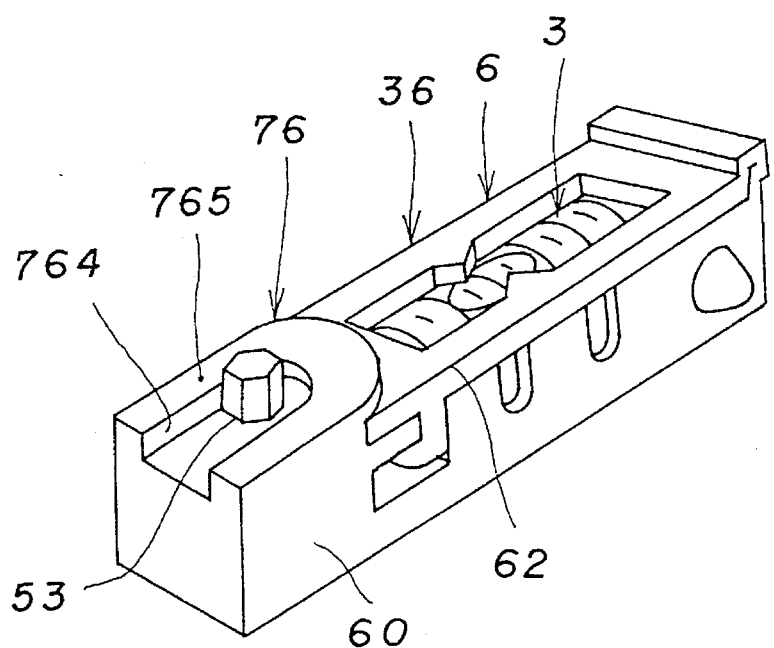

FIG. I is a front view of an automotive headlamp having a movable reflector, provided with the optical-axis adjustment confirming device according to the present invention;

FIG. 2 is a rear view of the device;

FIG. 3 is a sectional view taken along the line III—III in FIG. 2;

FIG. 4 is a perspective view of the level, resilient member, mounting member, etc.;

FIG. 5 is a perspective view, enlarged in scale, of the fixture and fixing screw;

FIG. 6 is a sectional view taken along the line VI—VI in FIG. 5;

FIG. 7 is a plan view of the casing in which the bubble tube is housed and of which the cover is closed;

FIG. 8 is a fragmentary perspective view of the pawl and coupling of the casing;

FIG. 9 is a fragmentary perspective view of the variants of the pawl and coupling of the casing;

FIG. 10 is a fragmentary perspective view showing the resilient retention of the bubble tube by the resilient retainer of the casing;

FIG. 11 is a plan view of the casing in which the bubble tube is housed and of which the cover is closed;

FIG. 12 is a sectional view taken along the line XII—XII in FIG. 11;

FIG. 13 is a sectional view of the casing shown in FIG. 12 of which the cover is opened;

FIG. 14 is a sectional view taken along the line XIV—XIV in FIG. 11;

FIG. 15 is a sectional view taken along the line XV—XV in FIG. 11;

FIG. 16 is a side elevation of the casing in which the bubble tube is housed and of which the cover is closed;

FIG. 17 is a side elevation of the casing shown in FIG. 16 of which the cover is opened;

FIG. 18 is a front view of the casing in which the bubble is housed and of which the cover is closed;

FIG. 19 is a rear view of the casing in which the bubble tube is housed and of which the casing is closed;

FIG. 20 is a sectional view of an automotive headlamp having a movable lamp unit, provided with the optical-axis adjustment confirming device according to a second embodiment in the first mode of the present invention;

FIGS. 21 to 25 show the first embodiment in the second mode of the present invention, of which:

FIG. 21 is a sectional view of an automotive headlamp having a movable reflector, provided with the optical-axis adjustment confirming device according to the present invention;

FIG. 22 is a perspective view of the level going to be installed on the receptacle of the movable reflector;

FIG. 23 is a sectional view of the engagement projection being passed through the engagement hole;

FIG. 24 is a sectional view of the same engagement projection having been passed through the engagement hole;

FIG. 25 is a sectional view of the initial-setting adjusting screw driven in the engagement projection;

FIGS. 26 to 33 show a first embodiment in a third mode of the present invention, of which:

FIG. 26 is a sectional view of the essential portion of an automotive headlamp having a movable reflector, provided with the optical-axis adjustment confirming device according to the present invention;

FIG. 27 is a sectional view taken along the line in FIG. 26;

FIG. 28 is a plan view of the fixture;

FIG. 29 is a sectional view taken along the line XXIX—XXIX in FIG. 28;

FIG. 30 is a sectional view taken along the line in FIG. 28;

FIG. 31 is a sectional view, enlarged in scale, of the level;

FIG. 32 is a perspective view of the level, tool, etc.;

FIG. 33 is a perspective view of the initial-setting adjusting screw turned with a tool;

FIG. 34 is a sectional view of the level, showing a second embodiment in the third mode of the present invention;

FIG. 35 is a perspective view of the level, tool, etc.;

FIG. 36 is a sectional view of the level, showing a third embodiment in the third mode of the present invention;

FIG. 37 is a perspective view of the level, tool, etc.; and

Figure 38:
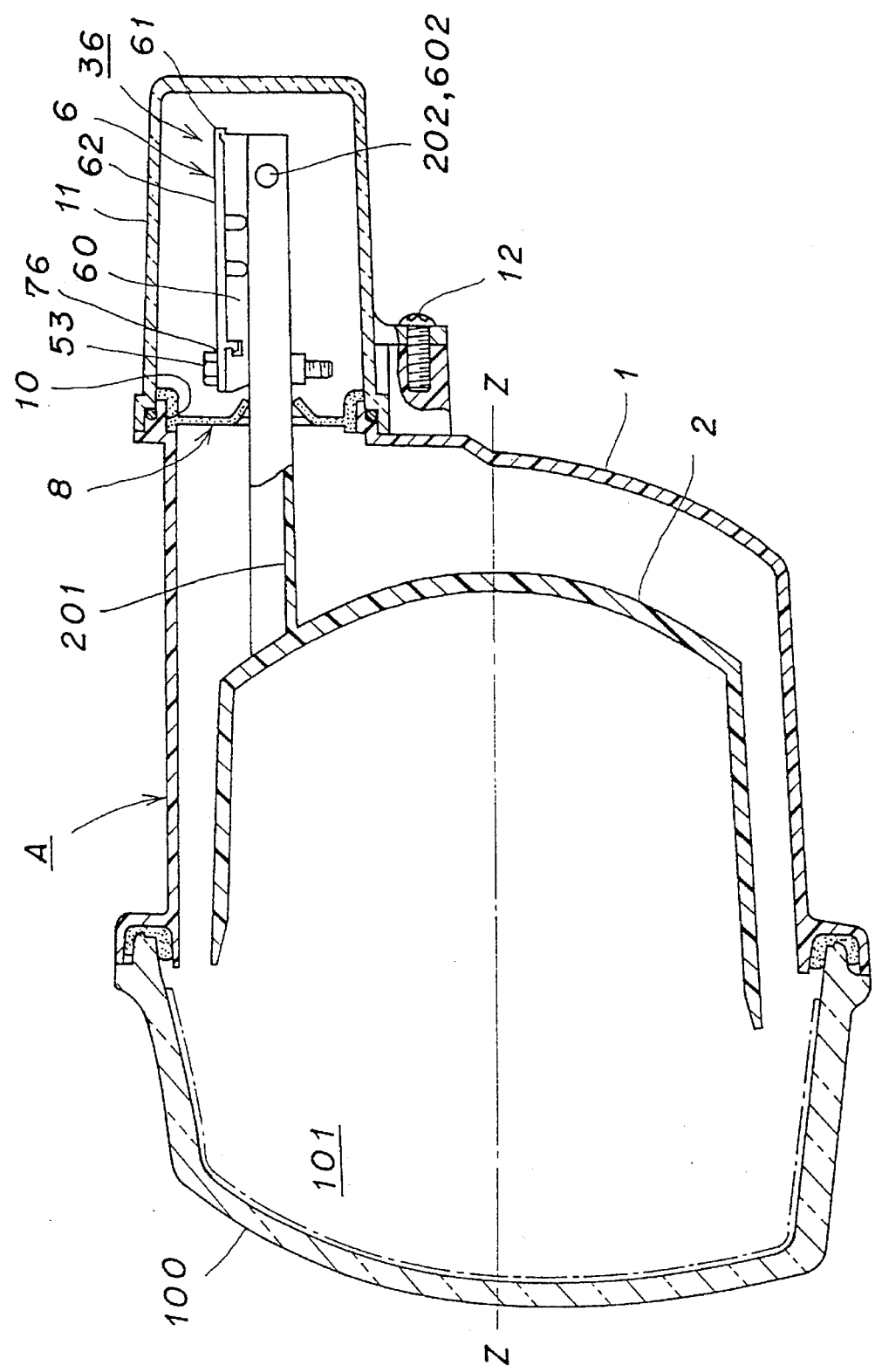

FIG. 38 is a sectional view of an automotive headlamp having a movable reflector, provided with the optical-axis adjustment confirming device according to the fourth embodiment in the third mode of the present invention.

Note that these Figures are prepared as simplified by omitting the elements having nothing to do directly with the optical-axis adjustment confirming device according to the present invention within a range in which the omission will have no influence on the understanding of the optical-axis adjustment confirming device.

DETAILED DESCRIPTION OF THE PREFERRED EMBODIMENTS

FIGS. 1 through 19 show the first embodiment of the optical-axis adjustment confirming device in the first mode of the present invention, which is provided on an automotive headlamp having a movable reflector.

Figure 1:
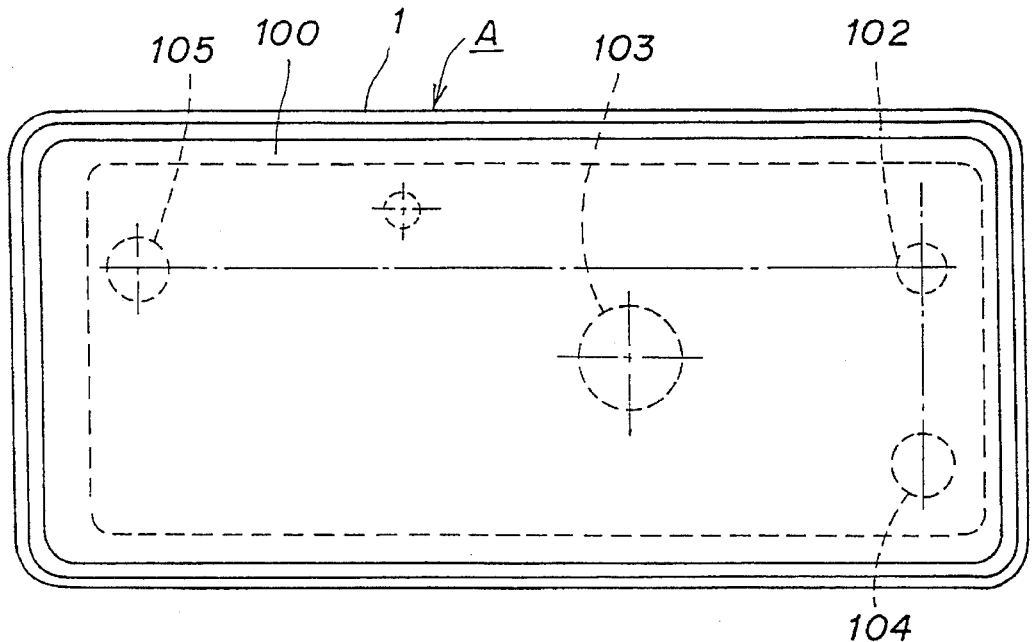

In the figures, the letter A denotes an automotive headlamp provided with the optical-axis adjustment confirming device according to the present invention. The device has a structure described below. As shown in FIGS. 1 through 3, the headlamp A comprises a lamp housing 1 as a mount body having a front lens 100 disposed at the front opening thereof. The front lens 100 and lamp housing 1 define together a bulb space 101 in which a movable reflector 2 as a to-be-adjusted body is mounted to the lamp housing 1 so as to be pivotable by a pivot bearing 102. The movable reflector 2 has formed on the front side thereof a reflecting surface, which will be described later, to reflect the light from a lamp bulb 103 toward the front lens 100. The lamp bulb 103 is disposed at the reflecting-surface side of the movable reflector 2 and inside the bulb space 101. A vertical optical-axis adjuster 104 and a horizontal optical-axis adjuster 105 are provided on the lamp housing 1 and the movable reflector 2, respectively. The movable reflector 2 (including the lamp bulb 103) is pivoted vertically or horizontally by operating the vertical optical-axis adjuster 104 or horizontal optical-axis adjuster 105, thereby adjusting the direction of the optical axis.

The above-mentioned vertical optical-axis adjuster 104, horizontal optical-axis adjuster 105, pivot bearing 102, etc. per se are well known as disclosed in, for example, the U. S. Pat. No. 5,055,980 and so their detailed description and illustration are omitted herein.

In FIG. 2, the reference numeral 106 denotes a horizontal optical-axis adjustment confirming device.

As seen in FIG. 3, an opening 10 is formed at the rear portion of the lamp housing 1 where the optical-axis adjustment confirming device according to the present invention is to be mounted. A step is formed on the circumferential edge of the opening 10 of the lamp housing 1. Two projecting mounts 22 and 23, upper and lower, having an L-shaped section, are formed integrally with the rear portion of the movable reflector 2 where the optical-axis adjustment confirming device according to the present invention is to be mounted.

In the figures, the reference numeral 53 denotes an initial-setting adjusting screw. The screw 53 is used to initially set the level 36 (which will be described later) and maintain the posture of the initially set level 36 against the resilience of a resilient member 70 (which will be described later). This screw 53 is driven as tapped into a boss 720 of a mounting member 72 (which will be discussed later) through a through-hole 600 (which will also be discussed later).

The level 36 has a casing 6 in which a bubble tube 3 is housed.

As shown in FIGS. 4 and 7, the bubble tube 3 has a transparent tube 30 made of, for example, BC (semi-rigid glass) in which a bubble 31 is formed in a liquid such as alcohol anhydride or the like filled in the tube 30. Scale divisions 32 are marked on the upper surface of the transparent tube 30 of the bubble tube 3 perpendicularly to the axial (longitudinal) direction of the tube 30. The transparent tube 30 of the bubble tube 3 has formed integrally in the center of one end thereof a generally conical projection 33 through which the liquid has been filled into the tube 30, and has also a fiat reference surface 34 formed at the other end thereof. When viewed laterally, the transparent tube 30 of the bubble tube 3 appears curved, the central portion thereof being somewhat high while both ends thereof are somewhat low.

The casing 6 is made of a synthetic resin such as PP (polypropylene). As shown in FIGS. 7, 13 and 17, the casing 6 has a cover 62 provided at one end of a body 60 thereof and the cover 62 has the one end thereof joined integrally to the casing body 60 by means of an integral coupling 61. The cover 62 can be opened and closed about the coupling 61.

The casing body 60 has a compartment 630 which houses the bubble tube 3. The casing body 60 is a hollow rectangle open at the top thereof as indicated at 63. The top opening 63 serves as an entry for housing the bubble tube 3 in the compartment 630, and also as a window for viewing the bubble tube 3 in the compartment 630. The casing body 60 has formed at the other end thereof a through-hole 600 for the screw 53 and also has a pair of engagement recesses 601 formed in either lateral side wall at the other end thereof. The casing body 60 has an opening 604 formed at one end thereof.

The cover 62 has the form of a rectangular plate. A through-hole 620 is formed nearly in the center of the whole cover 62 for viewing the bubble tube. There is formed on either lateral side at the other end of the cover 62 a pair of lance-shaped engagement pawls 621 which are to be engaged in the pair of engagement recesses 601. There is provided in the middle of the lateral opposite edges of the through-hole 620 in the cover 62 a pair of triangular projections 622 as the level reference. When the bubble in the bubble tube 3 is centered between these projections 622, it means that the bubble tube 3 is leveled or horizontal.

The aforementioned integral coupling 61 is of a thin hinge structure.

In the figures, the reference numeral 64 denotes a rib-like or plate-like resilient retainer provided at one end of the body 60 of the casing 6. The resilient retainer 64 is formed integrally as extending from the upper edge of the opening 604 at one end of the casing 6, and has a resilience because its thickness is made smaller than that of the casing 6. A cut 640 is formed in the resilient retainer 64. It extends from the lower end of the retainer 64 to the base of the casing 6. The cut 640 has a width a little smaller than the outside diameter of the projection 33 of the bubble tube 3 where the resilient retainer 64 positions itself when it is received in the casing 6.

In the figures, the reference numeral 65 denotes a fiat reference surface formed on the other end face of the compartment 630 of the casing body 60.

In the figures, the reference numeral 66 denotes opposite longitudinal side walls of the compartment 630 of the casing body 60. The inside spacing between these side walls 66 is nearly equal to or slightly smaller than the outside diameter of the transparent tube 30 of the bubble tube 3. These side walls 66 hold the bubble tube 3 as caught at both lateral sides thereof between them.

In the figures, the reference numeral 67 denotes the bottom of the compartment 630 opposite to the opening 63 in the casing 60. The upper side of this bottom 67 is curved as somewhat raised at the center thereof and while being a little dented at both ends thereof, both correspondingly to the lower-side shape of the bubble tube 3.

In the figures, the reference numeral 68 denotes projections formed integrally on the edges of the opening 63 of the casing body 60. They are provided in at least a pair and extend from the inner walls nearly in the middle of the opposite side walls 630. In this embodiment, they are lance-shaped pawls. The pawls 68 serve to keep the bubble tube 63 in the compartment 630 from slipping out of the opening 63. More particularly, the pawls 68 force the bubble tube 63 to the bottom 67 and thus cooperate with the bottom 67 to retain the bubble tube 63. The pawls 68 and bottom 67 retain the bubble tube 3 in a direction (direction of arrow e) perpendicular to the direction of resilient retention by the resilient retainer 64 and reference surface 65 (direction of arrow c) and the direction of retention by the opposite walls 66 (direction of arrow d), respectively.

In the figures, the reference numeral 7 denotes two pairs of cuts formed at both sides of the pair of pawls 68. The cuts 7 are formed in the opposite side walls 66 in an area ranging from the opening 63 nearly to the middle of the walls 66. The cuts 7 allow the pawls 68 to flexibly open and close when the bubble tube 2 is received in the casing 6 as will be described later.

In the figures, the reference numeral 69 denotes two pairs of couplings formed in the two pairs of cuts 7. These couplings 69 are provided to prevent the edge of the opening in the casing 6 from deflecting upward when the level 36 is initially set by pivoting as shown in FIG. 20, and to allow the pawls 68 to flexibly open and close when the bubble tube 3 is received in the casing 6. These couplings 69 connect both sides of the pawls 68 separated from each other by the cuts 7 to both side walls 66. More specifically, the coupling 69 is thin and formed flush with the inner surface of the lateral wall as shown in FIG. 8 or with the outer surface of the lateral wall 66 as shown in FIG. 9 or in the middle of the thickness of the cut 7 (not shown).

Thus, the bubble tube 3 is pushed into the casing body 60 through the opening 63 in the casing 6, the bubble tube 3 is put into contact at the lower surface thereof with the upper surface of the bottom 67 of the casing 6, and the projection 33 of the bubble tube 3 is inserted into the resilient retainer 64. Since the width of the cut 640 in the resilient retainer 64 is somewhat smaller than the outside diameter of the projection 33 of the bubble tube 3, where the resilient retainer 64 is positioned, when the bubble tube 3 is received in the casing 6, the resilient retainer 64 bends toward the conical end of the projection 34 of the bubble tube 3 (in the opposite direction to the direction of arrow b). Thus, the bubble tube 3 is forced in the direction of arrow b under the resilience of the resilient retainer 64, the reference surface 65 of the bubble tube 3 is forced to the reference surface 65 of the casing 6, thus the bubble tube 3 is caught between the reference surface 65 and the resilient retainer 64 of the casing 6, and resiliently retained in the axial direction thereof, namely, in the direction of arrow c. Also, the bubble tube 3 is retained as caught at both sides thereof between both the side walls 66 of the casing 6 in a direction perpendicular to the axial direction of the bubble tube 3, that is, in the direction of arrow d. Further, the bubble tube 3 is retained as caught in a direction perpendicular to the directions of resilience c of the resilient retainer 64 and reference surface 65 and the holding direction d of both the side walls 66 of the casing 6, namely, in the direction of arrow e. Thus, the bubble tube 3 is forced at the curved lower surface thereof to the curved bottom surface of the casing 6.

The bubble tube 3 is thus so securely retained in the compartment 630 of the casing 6 as to be blocked against axial displacement thereof, displacement thereof in a direction perpendicular to the axis thereof and rotation around the axis thereof. Hence, the bubble tube 3 can be securely held in the casing 6.

More particularly in this embodiment, the two pairs of cuts 7 are formed at both the sides of the pair of pawls 68. As shown in FIG. 7, when the bubble tube 3 is received in the casing 6, only the pair of pawls 68 flexibly opens a little outwardly, but both the side walls 66 do not open but securely hold the bubble tube 3 at both sides thereof so that the bubble tube 3 can be blocked against rotation about the axis thereof.

Once the bubble tube 3 is received in the casing 6, the cover 62 is pivoted about the integral hinge-like coupling 61 in the direction of the arrow, the pair of engagement pawls 621 of the cover 62 is engaged in the pair of engagement recesses 601 in the casing body 60, and the cover 62 closes the opening 63 in the casing body 60, as shown in FIG. 12. Since the through-hole 620 is formed in the cover 62, the bubble tube 3 is clearly seen through the hole 620. The level 36 has the structure having been described in the foregoing.

In the figures, the reference numeral 70 denotes a resilient member interposed between the level 36 and a mounting member 72 which will be described later. The resilient member 70 is formed integrally with the casing 6 of the level 36 by injection molding. It consists of a plate portion 700 at the mounting member 72, and a resilient coupling 701 connecting one end of the plate portion 700 and the bottom of the casing 6 at one end of the casing body 60 nearly in parallel to each other. The resilient coupling 701 has a U or V shape. The resilient member 70 is made of a synthetic resin having a same resilience as the casing 6. This resilient member 70 is provided to always force the level 36 so as to open axially of the initial-setting adjusting screw 53.

In the figures, the reference numeral 71 denotes a spring being a separate piece from the resilient member 70. This spring 71 consists of a long plate portion 710, a short plate portion 711, a resilient coupling 712 connecting the plate portions 710 and 711 nearly in parallel to each other and which has a U or V shape, and an engagement pawl 713 formed integrally with one end of the short plate portion 711 and bent at a right angle. The engagement pawl 713 of the spring 71 is engaged in an engagement recess in the bottom of the level 360 The short and long plate portions 711 and 710 and the resilient coupling 712 of the spring 71 are fixed, by pressing or bonding, to the bottom of the level 36, plate portion 700 of the resilient member 70 and the inner surface of the coupling member 701, respectively, thereby attaching the spring 71 to the resilient member 70. The spring 71 is made of a steel spring and always forces the level 36 along with the resilient member 70 so as to open axially of the initial-setting adjusting screw 53. The spring 71 increases the apparent spring constant of the resilient member 70. Thus, the tension applied to the initial-setting adjusting screw 53 becomes so large that the level 36 can be securely maintained in the initially set status.

The mounting member 72 is provided to mount the level 36 on the movable reflector 2. This mounting member 72 consists of a horizontal plate portion 721 extending horizontally from one end of the plate portion 700 of the resilient member 70, and a vertical plate portion 722 extending downward from one end of the horizontal plate portion 721. A boss 720 is formed integrally on the bottom side of the horizontal plate portion 721, and a circular through-hole 723 is formed in the vertical plate portion 722. The vertical plate portion 722 of the mounting member 72 of the level 36 is applied to the lower mounting member 23 of the movable reflector 2. Next, a fixing screw 724 is driven into the lower mounting member 23 through the through-hole 723 to install the level 36 to the movable reflector 2 by means of the mounting member 72 and the resilient member 70. Also, the resilient member 70 is interposed between the mounting member 72 and the level 36.

The initial-setting adjusting screw 53 is driven as tapped into the boss 720. However, a nut may be buried in the mounting member 72 in place of the boss 720.

The above-mentioned mounting member 72 may be a one consisting of an engagement projection formed on the casing 6 of the level 36, a receptacle formed on the movable reflector 2, an engagement hole formed in the receptacle and in which the engagement projection is engaged, and an initial-setting adjusting screw driven into the engagement projection through the level 36.

In the figures, the reference numeral 73 denotes a fixture for fixing the initial set level 36 to the movable reflector 2. This fixture 73 extends vertically upward from the other end of the casing body 60 of the casing 6 of the level 36. There is formed in the fixture 73 an elongated hole 730 in such a manner that the longitudinal direction thereof is coincident with the direction of resilience of the resilient member 70, that is, with the axial direction of the initial-setting adjusting screw 53. A step 731 is formed on the edge of the elongated hole 730 in the fixture 73. This step 731 is provided to prevent the fixture 73 from being applied, at the fight edge of the elongated hole 730 therein as viewed from the head 733 of the fixing screw 732, with a force which will move the level 36 in the direction of arrow j in FIG. 5 by means of the fixture 73 against the resilience of the resilient member 70 when the fixture 73 is fixed to the movable reflector 2 by driving the fixing screw 732 (which will be discussed later) in the directions of arrows h and i in FIG. 5, that is, clockwise as viewed from the head 733 of the fixing screw 732.

The fixing screw 732 is used as passed through the elongated hole 730 to fix the fixture 73 to the movable reflector 2. The outside diameter of the thread 734 of this fixing screw 732 is smaller than the width of the elongated hole 730, so the screw 732 will not hinder the fixture 73 from moving in the direction of resilience of the resilient member 70, that is, in the directions of arrows j and k in FIG. 5 when the initial setting of the level 36 is adjusted. After the initial setting of the level 36 is adjusted, the head 733 of the fixing screw 732 presses the edge of the elongated hole 730 to fix the fixture 73 to the movable reflector 2.

The fixing screw 732 is driven into the upper mount 22 of the movable reflector 2 through the elongated hole 730 in the fixture 73 formed integrally with the level 36 fixed to the movable reflector 2 to provisionally fix the fixture 73 to the movable reflector 2.

Then the initial-setting adjusting screw 53 is turned to adjust the initial setting of the level 36. Since the outside diameter of the thread of the fixing screw 732 is smaller than the width of the elongated hole 730 in the fixture 73, the fixture 73 is freely moved in the directions of arrows j and k in FIG. 5 and so will not interfere with the adjustment of the initial setting of the level 36.

After completion of the initial setting of the level 36, the fixing screw 732 is further driven in the directions of arrows h and i in FIG. 5 to fix the fixture 73 to the upper mounting member 22. There is a clearance between the thread 734 of the fixing screw 732 and the wall of the elongated hole 730 so that the adjustment of the initial setting of the level will not be interfered with. If the fixing screw is driven in the directions of arrows h and i in FIG. 5 while the head of the fixing screw abuts both the right and left edges of the elongated hole at a same time, a frictional force acts on both the fight and left edges of the elongated hole in the fixture, a rotational moment in the direction of arrow 1 in FIG. 5 acts on the fixture which in turn will pivot in that direction and the level goes out of place after completion of the adjustment of the initial setting, with the result that the state of the level 36 will possibly be deviated from the initial setting.

The step 731 is provided at the fight edge of the elongated hole 730 in the fixture 73 in the optical-axis adjustment confirming device according to this embodiment of the present invention to prevent the head 733 of the fixing screw 732 from abutting the right edge of the elongated hole 730. So, even when the fixing screw 732 is further driven in, the frictional force will act only on the left edge of the elongated hole 730 in the fixture 73, so that the rotational moment will not act on the fixture 73. Thus, the fixture 73 will pivot and the state of the level 36 can be prevented from being deviated from the initial setting.

In the optical-axis adjustment confirming device according to this embodiment of the present invention, when the fixing screw 732 is further driven in the directions of arrows h and i in FIG. 5, the frictional force will act only on the left edge of the elongated hole 730 in the fixture 73, the rotational moment in the direction of arrow h in FIG. 5 will be developed and so the fixture 73 will be applied with a force which will cause the fixture 73 to move in the direction of arrow k in FIG. 5, that is, in a direction in which the level 36 is opened under the resilience of the resilient member 70. However, since the initial-setting adjusting screw 53 maintains the posture of the level 36 against the resilience of the resilient member 70 to prevent the level 36 from being opened under the resilience of the resilient member 70, the fixture 73 can be prevented from moving in the direction of arrow k in FIG. 5, the posture of the level 36 can be maintained after adjustment of the initial setting and thus the state of the level 36 can be held against any deviation from the initial setting.

Thus, the level 36 can be securely fixed to the movable reflector 2 without the possibility that the state of the level 36 will be deviated from the initial setting thereof.

In the figures the reference numeral 11 denotes a transparent cap. This transparent cap 11 is made of PMMA (polymethyl methacrylate) or the like, and has the form of a hollow cylinder open at one end thereof as shown in FIGS. 2 and 3. Three mounting pieces 110 are formed integrally on the outer surface of the transparent cap 11 at the open-end side thereof and equidistantly from each other. Each of the mounting pieces 110 is nearly triangular, and they are radially disposed at a right angle with respect to the transparent cap 11. Also an outwardly projecting step is formed at the open end of the transparent cap 11. The transparent cap 11 covers the level 36 projecting out of the bulb space 10 1 of the automotive headlamp A, and closes the opening 10 of the lamp housing 1. Also an O-ring is interposed between the inner wall of the step at the open end of the transparent cap 11 and the outer wall of the step at the circumferential edge of the opening 10 of the lamp housing 1. The three mounting pieces. 110 of the transparent cap 11 are fixed to the circumferential edge of the opening 10 of the lamp housing 1 with three fixing screws 12.

The transparent cap 11 covers the level 36 projecting out of the bulb space 101 of the automotive headlamp A as mentioned above, and thus protects the level 36 against any external shock (such as any foreign matter or water coming from outside).

The optical-axis adjustment confirming device according to the present invention has the structure having been described in the foregoing. After the optical-axis of the automatic headlamp is adjusted by a specialist using a special equipment, the transparent cap 11 is removed and the level 36 is initially set by turning the screw 53 so that the bubble 31 in the bubble tube 3 coincides with the central reference line or the pair of central reference projections 622 of the casing 6. After completion of the initial setting of the level 36, the transparent cap 11 is fixed to the lamp housing 1 with the fixing screws 12. When the optical axis of the headlamp is considered to have been deviated from the correct direction due to a remodeling of, or loading to, the automobile after the initial setting, the automobile is made to stop on a horizontal floor or ground surface, and the level 36 is viewed from outside the transparent cap 11 to check the position of the bubble 31 in the bubble tube 3. If the bubble 31 is found off the central reference line, the vertical optical-axis adjuster 104 is operated, while viewing the movement of the bubble 31 from outside the transparent cap 11 kept fixed in place, to adjust the tilt of the movable reflector 2 so that the bubble 31 coincides with the central reference line. With this operation, the optical axis Z—Z restores its initial position having been correctly adjusted.

As having been described in the above, the optical-axis adjustment confirming device according to this embodiment of the present invention comprises the casing 6 of the level 36, resilient member 70, and the horizontal plate portion 721, vertical plate portion 722, and boss 720 of the mounting member 72, formed integrally with each other. Therefore, the initial-setting mechanism for the level 36 can be formed from a reduced number of parts.

FIG. 20 is a sectional view of the second embodiment in the first mode of the present invention. More particularly, this embodiment concerns an optical-axis adjustment confirming device according to the present invention, provided in an automotive headlamp having a movable lamp unit.

In FIG. 20, the same reference numerals as in FIGS. 1 to 19 denote the same elements as in FIGS. 1 to 19.

In the automotive headlamp B having a movable lamp unit, the lamp unit (to-be-adjusted body) comprising the lamp housing 1, a fixed reflector 200, a lamp bulb (not shown), etc. is pivotably installed to a car body 109 as the mount body by means of a pivot bearing, etc. (not shown) and the optical-axis adjustment confirming device (not shown) is fixed to the lamp unit and the car body 109. The level 36 is fixed to the lamp housing 1 of the automotive headlamp B having the movable lamp unit by means of the mounting member 72, resilient member 70 and spring 71. The level 36 of which the initial setting has been adjusted is fixed to the lamp housing 1 by means of the fixture 73. The level 36 is disposed outside the bulb space 101 and covered with the transparent cap 11.

The optical-axis adjustment confirming device according to this second embodiment has the same effect as the aforementioned embodiment.

FIGS. 21 to 25 show a first embodiment in the second mode of the present invention. The optical-axis adjustment confirming device according to the present invention is used in an automotive headlamp having a movable reflector.

In these the figures, the same reference numerals as in FIGS. 21–25 denote the same elements as in FIGS. 1 to 20.

In the figures, the reference numeral 130 denotes a level compartment formed integrally with the lamp housing 1 and projecting rearward from the upper rear thereof. The compartment 130 has formed in the top thereof an opening 131 in which a transparent cover 133 is removably attached with an O-ring 132 placed under the cover 133.

In the figures, the reference numeral 74 denotes a lance-shaped engagement projection provided on the casing 6 of the level 36 as connected by means of the resilient member 70. This engagement projection 74 consists of a plate portion 740 extending from one end of the plate portion 700 of the resilient member 70, a neck portion 741 extending downward from the bottom of the plate portion 740, a stepped engagement portion 742 formed at the end of the neck portion 741, and an insert portion 743 extending downward from the engagement portion 742 of the neck portion 741. The insert portion 743 has a wide slope extending from the lower end thereof to the engagement portion 742. The neck portion 741 and insert portion 743 of the engagement projection 74 have a nearly rectangular cross section. A slit 744 is formed nearly in the middle and longitudinally of the neck portion 741 and insert portion 743 of the engagement projection 74. The width of this slit 744 is a little smaller than the outside diameter of the thread of the initial-setting adjusting screw 53. A circular through-hole 745 is formed in the plate portion 740 It communicates with the slit 744. The engagement projection 74 is so designed that the neck portion 741 and insert portion 743 thereof deflect in a direction perpendicular to the slit 744.

In the figures, the reference numeral 75 denotes a receptacle projecting from the back of the movable reflector 2. The receptacle 75 consists of a horizontal plate portion 750 having a little larger width than that of the plate portion 700 of the resilient member 70, guide plates 751 formed vertically along the right and left edges of the horizontal plate portion 750, and an engagement hole 752 formed in the horizontal plate portion 750. The engagement hole 752 has the form of a rectangle larger than the neck portion 741 of the engagement projection 74 and smaller than the engagement portion 742.

The engagement projection 74 of the level 36 is engaged in the engagement hole 752 formed in the receptacle 75 of the movable reflector 2. Namely, when inserted into the engagement hole 752, the insert portion 743 of the engagement projection 74 deflects inwardly as shown in FIG. 23. Since the engagement projection 74 and engagement hole 752 are rectangular in shape, not circular, they serve to position and guide the level 36 when setting it to the receptacle 75.

When the engagement projection 74 has the insert portion 743 passed by the engagement hole 752, the insert portion 743 deflected inwardly opens outwardly so that the engagement portion 742 of the engagement projection 74 is engaged on the edge of the engagement hole 752 in the receptacle 75 as shown in FIG. 24. Thus, the level 36 is set on the receptacle 75. The plate portion 700 of the resilient member 70, integral with the level 36, is set between the guide plates 751 on opposite sides of the receptacle 75, and serves to position and guide the level 36 when the latter is set en the receptacle 75. It should be noted that a small clearance exists between the neck portion 741 of the engagement member 74 and the engagement hole 752.

Next, the initial-setting adjusting screw 53 is driven into the through-hole 745 in the engagement projection 74 and the slit 744 through the through-hole 600 in the level 36. Then the neck portion 741 and insert portion 743 of the engagement projection 74 are forcibly spread as shown in FIG. 25, the neck portion 741 is forced to the inner wall of the engagement hole 752, and the engagement portion 742 is engaged on the edge of the engagement hole 752. Thus, the engagement projection 74 is securely engaged in the engagement hole 752 so that the level 36 is fixed simply and positively to the receptacle 75, that is, to the movable reflector 2.

For initial-setting adjustment of the level 36, the transparent cover 133 is detached from inside the opening 131 formed in the compartment 130 of the lamp housing 1. After completion of the initial setting of the level 36, the transparent cover 133 is removably attached in the opening 131 formed in the compartment 130 of the lamp housing 1.

In the optical-axis adjustment confirming device according to this embodiment of the present invention, the engagement projection 74 is engaged in the engagement hole 752, and the initial-setting adjusting screw 53 is driven into the engagement projection 74, thereby permitting to fix the level 36 to the movable reflector 2 easily and securely.

In the above-mentioned embodiment, the receptacle 75 is formed integrally with the movable reflector 2, but it may be formed separately from the movable reflector 2.

Also, the engagement projection 74, engagement hole 752 in the receptacle 75, initial-setting adjusting screw 53, etc. may be used as mounting members in the optical-axis adjustment confirming device embodied in the first mode of the present invention.

In the aforementioned embodiment, the engagement projection 74 is formed integrally with the resilient member 70 integral with the casing 6 of the level 36, but the engagement projection 74 may be formed directly integrally with the casing of the level 36, not with the resilient member 70 integral with the casing of the level 36.

Furthermore in the aforementioned embodiment, the resilient member 70 is formed integrally with the casing 6 of the level 36, but it may be formed integrally with the receptacle 75 or it may be formed separately from the casing 6 and receptacle 75 and interposed between the level 36 and receptacle 75.

FIGS. 26 to 33 show a first embodiment in the third mode of the present invention. The optical-axis adjustment confirming device according to the present invention is provided in an automotive headlamp having a movable reflector.

In the figures, the same reference numerals as in FIGS. 1 to 25 denote the same elements as in FIGS. 1 to 25.

In the figures the reference numeral 20 denotes a fixing boss formed integrally on the rear surface of the movable reflector 2 where the optical-axis adjustment confirming device according to the present invention is to be installed. Two positioning convex portions 21 are formed integrally on either side of the fixing boss 20 of the movable reflector 2. Note that the positioning convex portions 21 are a little longer than the fixing boss 20.

In the figures, the reference numeral 602 denotes a pair of engagement convex portions formed integrally on either outer surface at one end of the casing body 60 of the casing 6 of the level 36. The engagement convex portions 602 have a nearly conical form for vertical fitting, in a pivotable manner, in the pair of engagement concave portions 522 in the mounting member 5. The engagement convex portion 602 may be in any other convex form than the above-mentioned conical form. Also it may be formed separately from the casing body 60 and fixed by bonding or by a similar means.

In the figures, the reference numeral 76 denotes a seat portion provided around the head of the initial-setting adjusting screw 53. The seat portion 76 is formed by lowering the top surface of the other end of the casing body 60 of the casing 6 of the level 36 by the thickness of the cover 62, extending the other end of the cover 62, and forming a U-shaped recess 760 in a portion of the cover 62 that corresponds to the hexagonal head of the initial-setting adjusting screw 53. The seat portion 76 has a mount surface 761 (the top surface of the cover 62) nearly perpendicular to the axis of the initial-setting adjusting screw 53. The mount surface 762 receives a tool 762 which is to be fitted on the head of the initial-setting adjusting screw 53 and used to turn the screw 53.

The seat portion 76 is so shaped as not to block the initial-setting adjusting screw 53 from being pivoted. Also it stably supports a hex socket wrench, as the tool for turning the initial-setting adjusting screw 53, when fitted on the head of the screw 53. More particularly, the mount surface 761 of the seat portion 76 is generally horizontal and the hexagonal head of the initial-setting adjusting screw 53 projects above the mount surface 761 of the seat portion 76. Thus, when the tool 762 is turned in the direction of arrow L or R, the seat portion 76 supports the tool 762 and guides the pivoting of the tool 762, thereby facilitating the adjustment of the initial setting. Furthermore, since the head of the initial-setting adjusting screw 53 is hexagonal in shape and the adjusting tool 762 is a hex. socket wrench, the initial-setting adjusting screw 53 is applied with only the pivoting force, not with the axial thrust, when the tool 762 is turned in the direction of arrow L or R.

In the figures, the reference numeral 5 denotes a member to mount to the movable reflector 2 a level 36 which will be described later. As shown in FIGS. 28 through 30, the mounting member 5 consists of a first mount plate 51 made of, for example, a thin steel sheet, and a second mount plate 52 made of, for example, a same thin steel sheet, which are fixed to each other by welding or the like technique.

The first mount plate 51 is narrow at one end thereof extending nearly to the middle point thereof and wide at the other end. The first mount plate 51 is bent at a right angle at the wide portion thereof to form a horizontal portion 510 and vertical portion 511. Further, both lateral edges extending from one end of the horizontal portion 510 of the first mount plate to the mid point of the vertical portion 511 are bent at a right angle. A screw hole 512 is formed nearly in the center of the horizontal portion 510. A through-hole 513 for a fixing screw 50 is formed in the center of the vertical portion 511 and two through-holes 514 for two positioning convex portions 21, respectively, are formed on both sides, respectively, of the through-hole 513.

The second mount plate 52 has the horizontal bottom thereof bent at a right angle at both sides thereof. The second mount plate 52 has the horizontal bottom thereof lanced from the center toward the end thereof to form a tongue-like leaf spring 520 as the resilient member. The spring 520 is bent horizontally at the end thereof to form a horizontal abutment which abuts the bottom of the casing 6. The horizontal abutment will be described later. The spring 520, that is, the resilient member, is formed integrally with the mounting member 5, but it may be formed integrally with the casing 6 of the level 36 (which will be described in detail later) or with both the mounting member 5 and casing 6.

There is formed in the other end of the horizontal bottom of the second mount plate 52 a through-hole 521 for a screw 53 used for maintaining the initial setting and which will be described in detail later. The through-hole 521 is so formed as to communicate with the screw hole 512 in the first mount plate 51. A pair of engagement conical concave portions 522 is formed each in one end of both vertical lateral sides of the second mount plate 52. It should be noted that the engagement concave portions 522 may have any other form than the conical one or it may be formed as pieces separate from the mount plate 52. In the latter case, they may be attached to the mount plate by bonding or the like.

As seen from FIG. 27, the projections 21 for positioning the movable reflector 2 are fitted in two through-holes 514 which positions the mounting member 5 to determine a position where the mounting member 5 is to be fitted to the movable reflector 2. Next, the mounting member 5 is fixed to the movable reflector 2 with a fixing screw 50. The positioning elements 21 and 514 are provided to keep horizontal in the lateral direction (direction of arrow a in FIG. 27) the mounting member 5 to be fixed to the movable reflector 2.

Thus the pair of engagement convex portions 602 of the level 36 is engaged in the pair of engagement concave portions 522, respectively, in the mounting member 5 in such a manner that the level 36 is supported by the mounting member 5 vertically pivotably around the fulcrum of the support members including the engagement concave portions 522 and engagement convex portions 602. Next, the initial-setting adjusting screw 53 is driven into a screw hole 512 in the mounting member 5 through the through hole 600 in the level 36. Thus, the level 36 is fixed to the mounting member 5 in such a manner that it can be initially set, and the level 36 will be maintained in the initially set posture against the resilience of the spring 520. The level 36 will be positioned as projected from the opening 10 in the lamp housing 1 to outside the bulb space 101 of the automotive headlamp A. Hence, the level 36 can be kept off the influence of the heat disspated from the lamp bulb 103 and also the level 36 can be so positioned as to facilitate the installation of the level 36 and the adjustment of the initial setting thereof.

The tool 762 is mounted on the mount surface 761 of the seat portion 76 engaged on the head of the initial-setting adjusting screw 53, and the screw 53 is turned in the direction of arrow L or R in FIG. 33 to adjust the initial setting of the level 36. Since the tool 762 is mounted in the mount surface 761 of the seat portion 76 in a direction perpendicular to the axis of the initial-setting adjusting screw 53, the force for turning the initial-setting adjusting screw 53 will not act in the axial direction of the screw 53 so that the level 36 will not be possibly moved against the resilience of the resilient member 70. Thus, even if the tool 762 is removed from the initial-setting adjusting screw 53 when the initial-setting of the level 36 has been completely adjusted the level 36 will not possibly be returned by the returning resilience of the resilient member 70 deflected. Therefore, the initial setting of the level 36 can be adjusted correctly and simply.

More particularly, the optical-axis adjustment confirming device according to the present invention can be optimally used in an automotive headlamp in which the level 36 is installed extending to the back of the lamp housing 1 by means of the mounting member 5, the arm length from a position where the mounting member 5 is fixed to the movable reflector 2 to the initial-setting adjusting screw 53 is long, the arm length from a position where the movable reflector 2 is fixed to the lamp housing 1 to the screw 53 is long and the level 36 deflects largely axially of the screw 53, when the initial setting of the level 36 is adjusted.

In the figures, the reference numeral 8 denotes a heat insulation member. The heat insulation member 8 is made of a soft resilient material, and consists of an annular portion 80 which fits the circumferential edge of the opening 10 of the lamp housing 1, and a sheet position 81 formed integrally with the annular portion 80 and which covers the opening 10, as shown in FIGS. 26 and 27. A plurality of slits is radially formed in the sheet portion 81 to facilitate the insertion of the level 36 and mounting member 5, and a plurality of round holes (not shown) is formed in the end portions of the slits to prevent the sheet portion 81 from being torn at the ends of the slits.

The annular portion 80 of the heat insulation member 8 is fitted on the circumferential edge of the opening 10 of the lamp housing 1, and the sheet portion 81 of the heat insulation member 80 closes the opening 10 of the housing 1.

The heat insulation member 8 serves to keep the level 36 located outside the automotive headlamp A off the thermal convection of air inside the bulb space 101. Thus, the thermal influence on the level 36 can be minimized so that the optical-axis adjustment can be confirmed with a correspondingly high accuracy.

The above-mentioned heat insulation member 8 is installed on the circumferential edge of the lamp housing 1, but it may be fixed on the circumferential edge of the open end of the transparent cap 11 which will be described below.

FIG. 34 is a sectional view of the level, showing a second embodiment in the third mode of the present invention, and FIG. 35 is a perspective view of the level, tool, etc.

In this embodiment, a clearance 763 is defined at the seat portion 76 between the casing body 60 and cover 62 of the casing 6.

FIG. 36 is a sectional view of the level, showing a third embodiment in the third mode of the present invention. FIG. 37 is a perspective view of the level, tool, etc.

In this embodiment, the top surface of the casing body 60 of the casing 6 is a little higher than or as high as the top surface of the cover 62 at the seat portion 76, a U-shaped recess 764 is formed at a position corresponding to the head of the initial-setting adjusting screw 53 at the casing body 60, and the top surface of the casing body 60 is used as a mount surface 765 for the seat portion 76.

FIG. 38 is a sectional view of an optical-axis adjustment confirming device according to a fourth embodiment in the third mode of the present invention and which is used in an automotive headlamp having a movable reflector.

In this embodiment, the mounting member 5 is not provided. The device according to the present invention (comprising the level 36, etc.) is mounted directly on a to-be-adjusted movable reflector 2 in such a manner that the level 36 can be initially set. Namely, a mounting member 201 is integrally provided at the rear portion of the movable reflector 2, and the mounting member 201 extends outwardly from an opening 10 in the lamp housing 1. The mounting member 201 has a similar axial sectional shape to that of the second mount plate 52 of the previously described mounting member 5. The level 36 is mounted on the horizontal bottom of the mounting member 201 extending outwardly, and pivotably supported at both vertical sides of the mounting member 201 by support members (a pair of engagement concave portions 202 and a pair of engagement projections 60). A resilient member (not shown) is interposed between the horizontal bottom of the mounting member 201 and the bottom of the level 36, and a screw 53 is driven into the mounting member 201 through the casing 6 of the level 36.

The above-mentioned second, third and fourth embodiments are similar in effect to the first embodiment.

What is claimed is:

1. In an automotive headlamp having a mount body, a to-be-adjusted body mounted pivotally on the mount body, a lamp bulb fixed to the to-be-adjusted body, and an optical-axis adjuster to vertically adjust an optical axis of the automotive headlamp by pivoting the to-be-adjusted body vertically with respect to the mount body, a device for confirming the adjustment of the optical axis of the automotive headlamp, comprising:

a level including a casing and a bubble tube which is housed and held in the casing, the vertical adjustment of the optical axis of a to-be-adjusted body being confirmed by visually checking a movement of a bubble in said bubble tube;

a mounting member which fixes the level to the to-be-adjusted body;

a resilient member interposed between the level and the mounting member, the resilient member being formed in a plate-like shape and integrally with the casing of the level and the mounting member, for urging the casing of the level in a predetermined direction which is associated with the movement of the bubble; and an adjusting screw for initially setting the level with respect to the mounting member and for keeping a posture of the level, after initially set, against a resilience of the resilient member.

2. A device as set forth in claim 1, wherein the resilient member includes a plate portion at the mounting member and a resilient coupling which connects one end of the plate portion and the bottom of the casing at one end of the casing body nearly in parallel to each other, the resilient coupling having a U or V shape.

3. A device as set forth in claim 1, wherein the resilient member includes a spring separate from the resilient member.

4. In an automotive headlamp having a mount body, a to-be-adjusted body mounted pivotally on the mount body, a lamp bulb fixed to the to-be-adjusted body, and an optical-axis adjuster to vertically adjust an optical axis of the automotive headlamp by pivoting the to-be-adjusted body vertically with respect to the mount body, a device for confirming the adjustment of the optical axis of the automotive headlamp, comprising:

a level including a casing and a bubble tube, the vertical adjustment of the optical axis of a to-be-adjusted body being confirmed by visually checking a movement of a bubble in said bubble tube;

a mounting member which fixes the level to the to-be-adjusted body;

a resilient member interposed between the level and the mounting member;

an initial-setting adjusting screw which is driven into the mounting member through the level and serves to initially set the level and keep a posture of the level, after initially set, against a resilience of the resilient member, the casing of the level and the resilient member being formed integrally with each other;

a fixture formed integrally with the casing of the level to fix the level, after initially set, to the to-be-adjusted body and having formed therein an elongated hole of which the longitudinal direction is coincident with the direction of resilience of the resilient member;

a fixing screw to be inserted through the elongated hole to fix the fixture to the to-be-adjusted body, of which the thread outside-diameter is smaller than the width of the elongated hole so that the screw will not interfere with the movement of the fixture in the direction of the resilience of the resilient member during adjustment of the initial setting of the level and that a head of the screw is forced to an edge of the elongated hole, after adjustment of the initial setting of the level, to fix the fixture to the to-be-adjusted body; and a step formed on the edge of the elongated hole in the fixture to prevent the fixture from being applied with a force which will move the level by means of the fixture against the resilience of the resilient member when the fixing screw is driven to fix the fixture to the to-be-adjusted body.

5. In an automotive headlamp having a mount body, a to-be-adjusted body mounted pivotally on the mount body, a lamp bulb fixed to the to-be-adjusted body, and an optical-axis adjuster to vertically adjust an optical axis of the headlamp by pivoting the to-be-adjusted body vertically with respect to the mount body, a device for confirming the adjustment of the optical axis of the automotive headlamp, comprising:

a level including a casing and a bubble tube which is housed and held in the casing, the vertical adjustment of the optical axis of the to-be-adjusted body being confirmed by visually checking a movement of a bubble in said bubble tube;

a resilient member formed integrally with the casing of the level, for urging the level in a predetermined direction which is associated with the movement of the bubble;

two engagement projections formed integrally with said resilient member;

a receptacle provided on the to-be-adjusted body; and having an engagement hole in which the engagement projections are engaged; and an adjusting screw which is driven into a space defined between the engagement projections through the casing of the level to perform initial-setting of the level, said screw keeping a posture of the level, after initially set, against the resilience of the resilient member with the engagement projections open in opposite directions to provide secure engagement thereof with the engagement hole.

6. A device as set forth in claim 5, wherein the engagement projections are lance-shaped.

7. A device as set forth in claim 5, wherein the engagement projections and hole are formed in such a manner that provides positioning of the casing with respect to the receptacle.

8. A device as set forth in claim 5, wherein the receptacle includes a guide which positions the level in place for installation.

9. In an automotive headlamp having a lamp housing, a movable reflector attached pivotally on the lamp housing, a lamp bulb provided on the movable reflector, and an optical-axis adjuster to vertically adjust an optical axis of the automotive headlamp by pivoting the movable reflector vertically with respect to the lamp housing, a device for confirming an adjustment of the optical axis of the automotive headlamp, comprising:

a level including a casing and a bubble tube which is housed and held in the casing, the vertical adjustment of the optical axis of the movable reflector being confirmed by visually checking a movement of a bubble in said bubble tube;

a mounting member which fixes the level to the movable reflector, said mounting member having one end secured on the movable reflector and another end extended rearward through an opening formed in the lamp housing, the level being fixed adjacent to the another end of said mounting member;

a resilient member interposed between the level and the mounting member;

an adjusting screw for initially setting the level with respect to the mounting member and for keeping a posture of the level, after initially set, against a resilience of the resilient member, and a seat portion provided on the casing around a head of the adjusting screw, having a mount surface nearly perpendicular to a longitudinal axis of the adjusting screw and which receives a tool to be engaged on the head of the adjusting screw so that the adjusting screw is applied with only a pivoting force without an axial thrust when the tool is turned.

10. A device as set forth in claim 9, wherein the casing of the level includes a body portion and a cover portion and the seat portion is a part of the cover portion.

11. A device as set forth in claim 9, wherein the casing of the level include a body portion and a cover portion and the seat portion is a part of the body portion.

12. A device as set forth in claim 9, wherein the mounting member includes a receptacle integral with the movable reflector and which receives the level.

13. A device as set forth in claim 9, wherein the mounting member is formed separately from the movable reflector.

14. In an automotive headlamp having a mount body, a to-be-adjusted body mounted pivotally on the mount body, a lamp bulb fixed to the to-be-adjusted body, and an optical-axis adjuster to vertically adjust an optical axis of the automotive headlamp by pivoting the to-be-adjusted body vertically with respect to the mount body, a device for confirming an adjustment of the optical axis of the automotive headlamp, comprising:

a level including a casing and a bubble tube which is housed and held in the casing, the vertical adjustment of the optical axis of the to-be-adjusted body being confirmed by visually checking a movement of a bubble in said bubble tube;

a mounting member which fixes said level to the to-be-adjusted body;

a resilient member formed in a plate-like shape and integrally with the casing of the level and the mounting member, for urging the casing of the level in a predetermined direction which is associated with the movement of the bubble;

an adjusting screw for initially setting the level with respect to the mounting member and for keeping a posture of the level, after initially set, against a resilience of the resilient member, a fixture formed integrally with the casing of the level to fix the level, after initially set, to the to-be-adjusted body and having formed therein an elongated hole of which the longitudinal direction is coincident with a direction of said fixture of resilience of the resilient member;

a fixing screw to be inserted through the elongated hole to fix the fixture to the to-be-adjusted body, of which the thread outside-diameter is smaller than a width of the elongated hole so that the screw will not interfere with the movement of the fixture in the direction of resilience of the resilient member during adjustment of setting of the level and that a head of the screw is forced to the edge of the elongated hole, after adjustment of the initial setting of the level, to fix the fixture to the to-be-adjusted body; and a step formed on the edge of the elongated hole in the fixture to prevent the fixture from being applied with a force which will move the level by means of the fixture against the resilence of the resilient member when the fixing screw is driven to fix the fixture to the to-be-adjusted body.

\* \* \* \* \*